United States Patent
Sankaran et al.

(10) Patent No.: US 11,767,750 B1
(45) Date of Patent: Sep. 26, 2023

(54) GAS-OIL RATIO FORECASTING IN UNCONVENTIONAL RESERVOIRS

(71) Applicant: XECTA INTELLIGENT PRODUCTION SERVICES, Houston, TX (US)

(72) Inventors: Sathish Sankaran, Spring, TX (US); Hardikkumar Zalavadia, Richmond, TX (US); Utkarsh Sinha, Houston, TX (US)

(73) Assignee: Xecta Intelligent Production Services, Houston, TX (US)

( * ) Notice: Subject to any disclaimer, the term of this patent is extended or adjusted under 35 U.S.C. 154(b) by 0 days.

(21) Appl. No.: 18/076,921

(22) Filed: Dec. 7, 2022

Related U.S. Application Data

(60) Provisional application No. 63/352,885, filed on Jun. 16, 2022.

(51) Int. Cl.
*E21B 47/008* (2012.01)
*G01V 99/00* (2009.01)
*E21B 47/07* (2012.01)

(52) U.S. Cl.
CPC ............ *E21B 47/008* (2020.05); *E21B 47/07* (2020.05); *G01V 99/005* (2013.01); *E21B 2200/20* (2020.05)

(58) Field of Classification Search
CPC .... E21B 47/008; E21B 47/07; E21B 2200/20; G01V 99/005
USPC .......................................................... 703/10
See application file for complete search history.

(56) References Cited

PUBLICATIONS

Shahamat, Mohammad Sadeq, et al. "Inflow performance relationship for unconventional reservoirs (transient IPR)." SPE/CSUR Unconventional Resources Conference. OnePetro, 2015. pp. 1-19. (Year: 2015).*

Yu, Shaoyong. "A new methodology to forecast solution gas production in tight oil reservoirs." SPE/CSUR Unconventional Resources Conference-Canada. OnePetro, 2014. pp. 1-26. (Year: 2014).*

Nguyen, H. T., and F. C. Mundo. "Improving artificial lift design through dynamic simulation." SPE North America Artificial Lift Conference and Exhibition. OnePetro, 2016. pp. 1-17. (Year: 2016).*

(Continued)

*Primary Examiner* — John E Johansen
(74) *Attorney, Agent, or Firm* — Baker Botts L.L.P.

(57) ABSTRACT

An apparatus for estimating a gas-oil ratio for a well in an unconventional reservoir comprises a processor associated with a control system. The processor is configured to determine a bottomhole pressure for the well. The processor is further configured to determine one or more pressure, volume, and temperature (PVT) properties associated with fluid flow and to determine transient well performance. The processor is further configured to determine a Productivity Index (PI) for the well for a plurality of time steps and to determine an inflection point. The processor is further configured to estimate the gas-oil ratio of the well after the inflection point based on the determined transient well performance and to perform the fluid production rate forecast based on the determined PI. The processor is further configured to apply the fluid production rate forecast to the estimated gas-oil ratio to determine an instantaneous gas-oil ratio.

20 Claims, 29 Drawing Sheets

(56) References Cited

PUBLICATIONS

Bi, R., Luo, S., Lutkenhaus, J. L., Nasrabadi, H., 2020. Compositional Simulation of Cyclic Gas Injection In Liquid-Rich Shale Reservoirs Using Existing Simulators with a Framework for Incorporating Nanopores. SPE Improved Oil Recovery Conference. SPE-200342-MS. DOI: 10.2118/200342-MS.

Bi, R., Nasrabadi, H., 2019. Molecular simulation of the constant composition expansion experiment in shale multi—scale systems. Fluid Phase Equilibria, 495, 59-68.DOI: 10.1016/j.fluid.2019.04. 026.

Bohacs, K.M., Passey, Q.R., Rudnicki, M., Esch, W.L., and O.R. Lazar. "The Spectrum of Fine-Grained Reservoirs From" Paper presented at the International Petroleum Technology Conference, Beijing, China, Mar. 2013. doi: https://doi.org/10.2523/IPTC-16676-MS.

Chaudhary, A. S., Ehlig-Economides, C. A., Wattenbarger, R. A., 2011. Shale oil production performance from a stimulated reservoir volume. Proceedings of SPE Annual Technical Conference and Exhibition, Oct. 30-Nov. 2, Denver, Colorado, USA. SPE-147596-MS. DOI: 10.2118/147596-MS.

Chen, C., Liu, X., Girardi, A., McMullen, A., Gao, G., Bhattacharya, S., Chowdhury, N. (Jul. 25, 2019). Using Dynamic Modeling to Correct Decline Curve for Liquid-Rich Shale Reservoir. Unconventional Resources Technology Conference. doi:10.105530/urtec-2019-485.

Jones, R. S. (Aug.1, 2017). Producing-Gas/Oil-Ratio Behavior of Multifractured Horizontal Wells in Tight Oil Reservoirs. Society of Petroleum Engineers. doi:10.2118/184397-MS.

Khoshghadam, M., Khanal, A., Yu, C., Rabinejadganji, N., & Lee, W. J. (Jul. 24, 2017). Producing GasOil Ratio Behavior of Unconventional Volatile-Oil Reservoirs, and Its Application in Production Diagnostics and Decline Curve Analysis. Unconventional Resources Technology Conference. doi:10.15530/URTEC-2017-2670925.

Luo, S., Lutkenhaus, J. L., Nasrabadi, H., 2018. Multiscale fluid-phase-behavior simulation in shale reservoirs using a pore-size-dependent equation of state. SPE Reservoir Evaluation & Engineering, 21(04), 806-820. DOI: 10.2118/187422-PA.

Luo, S., Lutkenhaus, J., Nasrabadi, H., 2019. A Framework for Incorporating Nanopores in Compositional Simulation to Model the Unusually High GOR Observed in Shale Reservoirs. In SPE Reservoir Simulation Conference. DOI: 10.2118/193884-MS.

Martin, John C., "Simplified Equations of Flow in Gas Drive Reservoirs and the Theoretical Foundation of Multiphase Pressure Buildup Analyses." Trans. 216 (1959): 321-323. doi: https://doi.org/10.2118/1235-G.

Molinari, D., and Sankaran, S. 2021a. "A Reduced Physics Modeling Approach to Understand Multiphase Well Production Performance for Unconventional Reservoirs". Paper presented at the SPE/AAPG/SEG Unconventional Resources Technology Conference, Houston, Texas, USA, Jul. 2021. doi: https://doi.org/10.15530/urtec-2021-5023.

Molinari, D., and Sankaran, S. 2021b. "Merging Physics and Data-Driven Methods for Field-Wide Bottomhole Pressure Estimation in Unconventional Wells". Paper presented at the SPE/AAPG/SEG Unconventional Resources Technology Conference, Houston, Texas, USA, Jul. 2021. doi: https://doi.org/10.15530/urtec-2021-5261.

Molinari, Diego, Sankaran, Sathish, Symmons, Dave, and Michael Perrotte. "A Hybrid Data and Physics Modeling Approach Towards Unconventional Well Performance Analysis." Paper presented at the SPE Annual Technical Conference and Exhibition, Calgary, Alberta, Canada, Sep. 2019. doi: https://doi.org/10.2118/196122-MS.

Molinari, Diego, Sankaran, Sathish, Symmons, Dave, Perrotte, Michael, Wolfram, Edward, Krane, Ilsa, Han, Jichao, and Neha Bansal. "Implementing an Integrated Production Surveillance and Optimization System in an Unconventional Field." Paper presented at the SPE/AAPG/SEG Unconventional Resources Technology Conference, Denver, Colorado, USA, Jul. 2019. doi: https://doi.org/10.15530/urtec-2019-41.

Parag Bandyopadhyay, Abhay Sharma, Development of a new semi analytical model for prediction of bubble point pressure of crude oils, Journal of Petroleum Science and Engineering, vol. 78, Issues 3-4, 2011, pp. 719-731, ISSN 0920-4105, https://doi.org/10.1016/j.petrol.2011.06.007.

Perrine, R.L. "Analysis of Pressure-buildup Curves." Paper presented at the Drilling and Production Practice, New York, New York, Jan. 1956.

Pradhan, Y. "Observed Gas-Oil Ratio Trends in Liquids Rich Shale Reservoirs." URTEC-2020-3229-MS. Paper presented at the SPE/AAPG/SEG Unconventional Resources Technology Conference, Virtual, Jul. 2020. doi: https://doi.org/10.15530/urtec-2020-3229.

Pronk, B., Elmer, W., Harms, L., Nelle, W., & Hacksma, J. (Apr. 8, 2019). Single Point High Pressure Gas Lift Replaces ESP in Permian Basin Pilot Test. Society of Petroleum Engineers. doi:10.2118/195180-MS.

Sullivan, FM, Montgomery, JB (Dec. 2015). The Salient Distribution of Unconventional Oil and Gas Well Productivity. MIT Energy Initiative. 2015—MITEI-WP-May 2015.

Vogel, J.V. "Inflow Performance Relationships for Solution-Gas Drive Wells." J Pet Technol 20 (1968): 83-92. doi: https://doi.org/10.2118/1476-PA.

Whitson, C. H., & Sunjerga, S. (Jan. 1, 2012). PVT in Liquid-Rich Shale Reservoirs. Society of Petroleum Engineers. doi:10.2118/155499-MS.

Pan, Yuewei, Li, Guoxin, Qin, Jianhua, Zhang, Jing, Deng, Lichi, and Ran Bi. "A Novel Probabilistic Approach for GOR Forecast in Unconventional Oil Reservoirs." Paper presented at the SPE/AAPG/SEG Unconventional Resources Technology Conference, Houston, Texas, USA, Jul. 2021. doi: https://doi.org/10.15530/urtec-2021-5068.

Xue Xu, Yang Changdong, Park Jaeyoung, Sharma Vishal Kumar, Datta-Gupta Akhil, and Michael J. King. "Reservoir and Fracture-Flow Characterization Using Novel Diagnostic Plots." Spe J. 24 (2019): 1248 1269. doi: https://doi.org/10.2118/194017-PA.

Chen, F., Bi, R., Nasrabadi, H., "Molecular Simulation of Multiscale Multi-Component Hydrocarbon Phase Behavior in Liquid-Rich Shale Reservoirs". Texas A&M University, Paper presented at the SPE/AAPG/SEG Unconventional Resources Technology Conference, Houston, Texas, USA, Jul. 26-28, 2021. DOI 10.15530/urtec-2021-5293.

* cited by examiner

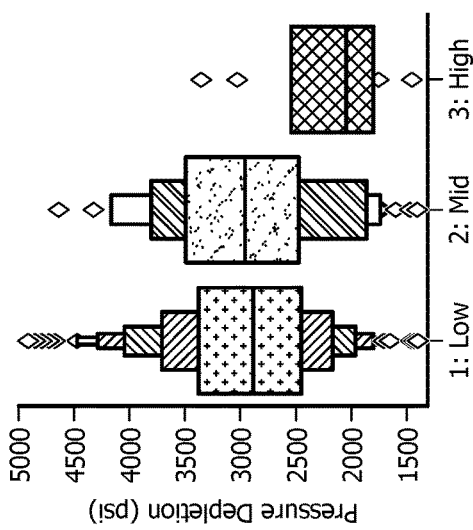
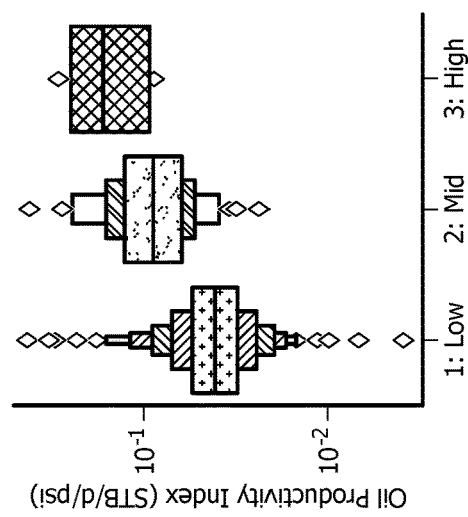
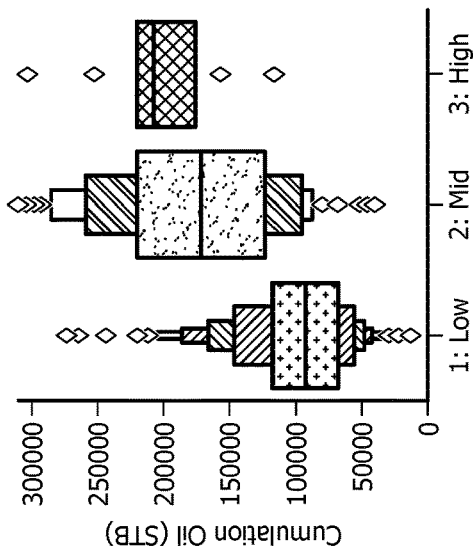
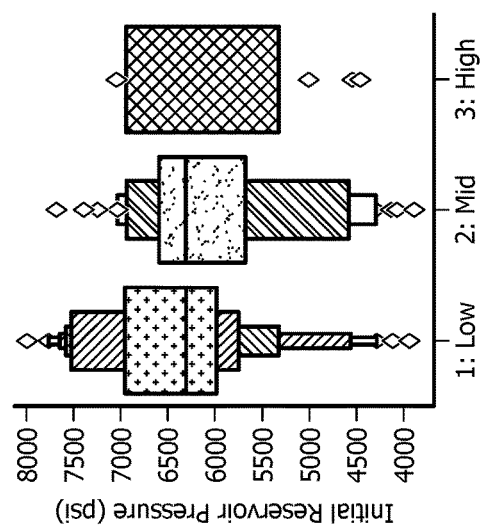
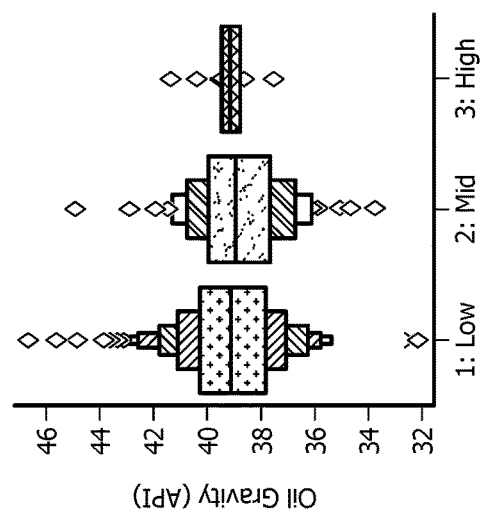
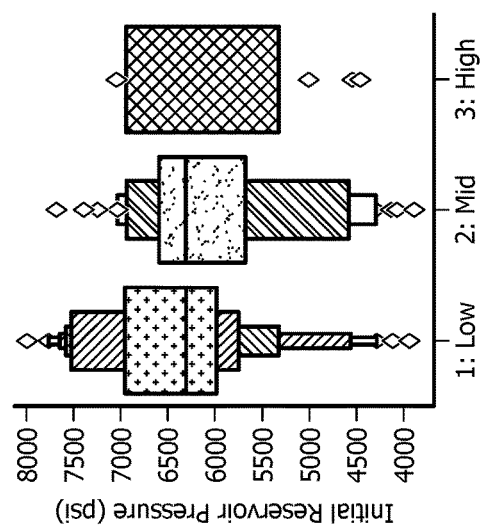

GAS-OIL RATIO FORECASTING IN UNCONVENTIONAL RESERVOIRS

CROSS-REFERENCE TO RELATED APPLICATION

This application claims priority to U.S. Provisional Application No. 63/352,885 filed Jun. 16, 2022 entitled "GOR FORECASTING IN UNCONVENTIONALS", by Sathish Sankaran, Hardikkumar Zalavadia, and Utkarsh Sinha, which is incorporated herein by reference as if reproduced in its entirety.

TECHNICAL FIELD

This invention relates to the monitoring of fluid depletion from subterranean reservoirs.

BACKGROUND

The development of unconventional reservoirs has triggered a reimagination of reservoir engineering models and methodologies. The completion of horizontal wells with multi-stage fracturing has enabled the commercial production of hydrocarbon resources in ultra-low permeability rock. It is important to properly understand well performance across the whole life of the wells to optimally develop unconventional reservoirs and extract maximum economic value. Identification of the key drivers and production behaviors is critical to generate robust production forecasting, enable proper field development planning and production optimization through the most appropriate operational strategy.

Traditional well performance analysis and modeling methodologies, which have been developed over the last century through accumulated learnings from conventional field development, originally proved insufficient to properly represent the production behavior in unconventional wells. These are characterized by rapid production decline and long periods of transient flow generated by a complex fractured system in very low permeability. For the past two decades, several researchers and practitioners have focused on trying to understand rate and pressure transient behaviors of unconventional reservoirs under different production strategies.

Decline curve analysis (DCA) has been adopted as one of the most popular production forecasting methods. The original production decline model introduced by Arps (1945) has been modified for unconventionals by allowing b-factors larger than 1 to represent prolonged transient flow and using multiple segments to represent various flow regimes. Additionally, novel decline curve models have emerged to represent more complex and sophisticated production decline trends such as modified hyperbolic, power law. Decline curve analysis methods are very popular as they are fast, repeatable, and easy to implement and maintain, and they remain a favorite method for reserves booking and production planning. However, by only considering rate versus time trends and ignoring the pressure, they implicitly assume constant operating conditions, and cannot fully capture changes in the well production such as choke changes, artificial lift installations and change in the artificial lift operational parameters. Furthermore, many wells are surface constrained, and often do not exhibit a discernable production decline. In such wells, the DCA method cannot be applied, and surrogate type curves are often used, with little fidelity to the actual production data. Finally, the decline models are single-phase and empirical, and do not capture fundamental physics, such as the expected gas-oil ratio (GOR) increase on oil systems as the solution gas is liberated when pressure declines below saturation pressure.

For unconventional oil reservoirs, quantitative analysis for the producing GOR has not been considered often in the past due to the minimal recoverable value and the complexity involved in modeling GOR as compared to liquid or oil rates. Significant emphasis has been laid on well performance analysis to understand the economic viability of a well, developed in an unconventional reservoir. The majority of focus has been driven towards identifying oil recovery as oil is a primary phase for most shale oil wells. However, as the shale plays get more mature and have evolved over the past decade, there is an increasing concern of maintaining profitability of these wells with increasing gas oil ratios and declining oil production and thus missing oil volume expectations. Therefore, understanding GOR behavior and its forecast is of vital importance to bind the primary product oil rates forecast and the gas rates forecast in unconventionals.

Several factors influence the behavior of producing GOR. In a conventional reservoir, the initial production will start at the solution GOR, and as the reservoir pressure declines to less than the bubble point, then gas starts to evolve from oil as free gas in the reservoir. When critical gas saturation is surpassed, free gas flows from the reservoir to the wellbore. In a conventional reservoir with high permeability, GOR is driven by the average reservoir pressure. In unconventional reservoirs, GOR behavior is driven by bottom-hole pressure schedule, the degree of undersaturation, fracture parameters, gas-oil PVT properties, relative permeabilities, bubble point suppression effects and duration of the transient-flow regime. However, BHP has been seen to be a major influencer of GOR behavior in unconventional multi-fractured horizontal wells (MFHW) as the GOR behavior progresses through several stages. Early producing GOR is constant at initial solution GOR, while flowing bottom hole pressure is above bubble point. GOR rises when flowing bottom hole pressure goes below bubble point. Then, transient GOR plateaus which is a characteristic of linear flow. Flow regimes diagnostic Log-Log plot can be combined with GOR and curve to identify GOR changing stages.

Analytical methods such as rate transient analysis (RTA) have been also adopted as fast and simplified models which capture some physics, including rock and fluid properties and the transient flow regimes, with the premise of generating a more representative production forecast. The focus is on identifying and modeling key flow regimes with analytical or semi-analytical models, often assuming homogeneous and isotropic reservoirs. The modeling paradigm is to postulate a flow mechanism with the underlying model assumptions and then use production data to fit the model to estimate parameters (e.g., fracture properties, permeability etc.). By incorporating rates and pressures as a function of time, RTA can model changing well operating conditions. However, in practice these models are difficult to generalize for all wells, as they require knowledge of rock properties (such as porosity and permeability in both matrix and "enhanced" stimulated zones) and completion attributes (number of fractures, fracture conductivity and geometry such as half-length, fracture height etc.) that cannot be accurately defined and measured, introducing significant input uncertainty in the models. With so many modeling knobs, solutions are non-unique and difficult to constrain. Often, a pragmatic model implementation involves assuming many of these input parameters through rules of thumb and engineering judgment, which adds significant bias to the models as many of these inputs cannot be empirically validated.

Example models may include more complex physics, such as irregular fracture geometries, heterogeneous reservoir properties, stress-dependent rock properties (geomechanical effects), compositional PVT, adsorption, Knudsen diffusion, PVT suppression etc. While numerical models may provide mechanistic understanding of relevant phenomena, there is no consensus on which are the "right" physics to properly model unconventional reservoirs in a particular setting for routine business processes such as forecasting and production optimization. Each company and researcher may use a different set of assumptions and modeling principles, resulting in various modeling philosophies such as using planar fractures in a homogeneous field, dual porosity systems, discrete fracture networks, dynamic stimulated rock volumes, etc. Each model represents a different "belief system", embedding some physics which are thought to fully represent the modeled phenomena. But in practice, diverse modeling approaches produce a wide and often diverging set of answers. Also, numerical models are computationally intensive, taking time to build and history match, which requires expensive and extensive data collection, often not available for most wells. In real field applications with hundreds or thousands of wells, simulation models are unable to keep up with the pace of development and cannot scale to cover every well, so as a compromise they are typically applied in few representative wells. Thus, any conclusion will be affected by the sample bias depending on the selected history-matched wells, while not all the data is being leveraged.

Data-driven models (such as statistical learning techniques and machine learning) have been successfully implemented as alternatives to the traditional domain-specific physics-based reservoir models. Given sufficient training data, these models can capture complex relationships and predict hydrocarbon production from a variety of data inputs, including rock-fluid properties, completion design parameters and operational factors. These models can be very powerful for various applications in descriptive, predictive, and prescriptive analytics, but have their own inherent drawbacks. First, sufficient training data is required to properly capture meaningful correlations, both in quantity (large number of wells) and quality (representing variability in the input ranges). Data-driven models may only be valid within the training data features and ranges, so they tend to be very specific to a given field/basin/sector and not fully generalizable. Most training data available does not include pressure and, inherently, the data set is biased toward the specific operating mode of the well, which is often ignored. They are not guaranteed to provide a robust extrapolation for more general conditions as they do not incorporate any physics acting as a constraint. For the most complex machine learning models, there is also the problem of interpretability, as the models are often perceived as a black box, difficult to explain and audit, which may limit their adoption in a business setting.

Existing implementation may have certain limitations, being only applicable for wells producing above saturation pressure, since it did not incorporate the effect of increasing gas-oil ratio. Also, PVT properties and formation compressibility were approximated as constant values under a slightly compressible fluid assumption; hence, the model was not applicable to compressible fluids, such as volatile oil and gas. Finally, the model was only applicable to natural flow and gas lift production methods, whereas it is very common to produce unconventional wells with other artificial lift types such as sucker rod pumps or electro-submersible pumps (ESP).

BRIEF DESCRIPTION OF THE DRAWINGS

FIGS. 22A-22F is a set of plots showing an increasing drainage volume correlated with higher productivity index.

Figure 1:
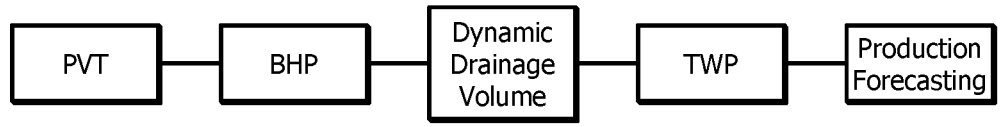
FIG. 1 is an illustration of a well performance analysis summary.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

It is desired to have fast, robust, repeatable, and scalable methods to model well performance in unconventional reservoirs, able to capture every well, and combining the strengths of data-driven methods (e.g., speed, data-centricity and flexibility) and physics-based models (e.g., robust extrapolation, generalization and interpretability). To that end, the present disclosure provides an example hybrid methodology based on a novel formulation combining diffusive time of flight and material balance, using the productivity index as key variable for performing production diagnostics and forecasting.

Understanding well production performance in unconventional reservoirs may be useful for achieving optimal field development and maximizing value. It may be desired to have a robust and scalable method for quantifying well productivity, which can be applied in a practical manner to all wells, overcoming the limitations of decline curve analysis (not representative of changing operating conditions) and analytical and numerical models (based on either simplifying assumptions, manual interpretation or not suitable for large scale usage).

The present disclosure provides, in certain embodiments, a gas-oil ratio ("GOR") modeling procedure that may be based on a hybrid well performance analysis formulation that is data centric. This data centric analysis may be based on routinely measured data for most wells—namely, production rates, flowing pressure, and fluid properties—but is rooted in physics-based principles. Traditional well performance analysis and modeling methodologies, which have been developed over the last century through accumulated learnings from conventional field development, may have been originally proved insufficient to properly represent the production behavior in unconventional wells. These wells are herein characterized by rapid production decline and long periods of transient flow generated by a complex fractured system in very low permeability.

In certain embodiments, the hybrid reservoir modeling methodology of the present disclosure may be based on identifying transient well performance (TWP). The method may be based on a novel formulation that combines diffusive time of flight, succession of pseudo-steady state material balance and transient productivity index concepts for performing production diagnostics and forecasting. This methodology may be extended to forecast GOR, which also accounts for changing artificial lift strategies and hence changing bottom hole pressure conditions, which is a practical and helpful consideration since most unconventional wells experience operational changes along its life.

Well Performance Analysis

One example embodiment of this disclosure is a method to estimate transient well productivity index (PI) for every well at field scale to understand unconventional well performance. This transient PI may then be used in a variety of applications, including well forecasting, artificial lift planning, production optimization and field development planning.

The methods of the present disclosure combine reduced physics and data-driven techniques using a series of steps to characterize well performance as shown in FIG. 1. Example embodiments The TWP methodology may use routinely available production rates, combined with the PVT and flowing bottomhole pressure. It may handle variable rate and bottomhole pressure, pressure depletion, variable compressibility, non-linear pressure-dependent PVT properties, and represent both liquid and gas systems producing under any production method (e.g., natural flow, gas lift, ESP, sucker rod pumps etc.). At a high level, material balance may be applied through a succession of pseudo-steady states on the drainage volume evolution of a closed system to approximate the transient well performance.

Initially, the PVT properties may be estimated to characterize fluid behavior. Flowback data and a non-parametric regression method called ACE (Alternating Conditional Expectation) may be used to estimate saturation pressure and initial solution gas-oil ratio, corrected for separator conditions. The flowing bottomhole pressure for the whole production history may be calculated from surface measurements, as it is necessary to capture the true downhole flowing conditions. Then, an optimization routine may be applied to estimate the transient well performance, calculating the dynamic drainage volume, average reservoir depletion and productivity index (PI). PI may be used as the base variable to perform production forecasting under expected future operating conditions, and it may allow for estimating the inflow performance relationship (IPR) curves to capture well deliverability, a key output required for production optimization.

PVT

Certain production modeling in the well and reservoir system may require knowledge of the PVT fluid properties, which may be an input for some physics-based models. As used herein, "PVT" properties collectively refers to properties for each of the pressure, volume, and temperature collectively. In other embodiments, "PVT" may refer to properties corresponding to a subset of the pressure, volume, and temperature. PVT represents the change in fluid properties as fluid flows through the reservoir, well and surface equipment under different pressure and temperature conditions. The PVT properties for each well may be estimated from lab-based measurements.

Ideally, the PVT properties for each well may be measured in the laboratory using a representative sample from the original fluid in the reservoir. In practice, PVT characterization with full laboratory analysis is not routinely done for most wells. As most unconventional fields may exhibit heterogeneous fluid properties for different locations and formations, extrapolating PVT properties from a few wells to represent the whole field without extensive fluid modeling may be inadequate, as it will often fail to capture such heterogeneities.

A field-wide equation of state (EOS) model may provide more comprehensive fluid characterization that describe the phase and volume behavior of a fluid system. The EOS model can then be used to estimate the fluid properties at any well location based on its corresponding fluid composition, reservoir pressure and temperature. While reservoir pressure and temperature may be mapped across large areas, well level downhole fluid compositions may not be readily available. Fluid initialization using physical measurements or EOS model may be used to determine the initial fluid composition for undersaturated or saturated reservoirs. However, this may be cumbersome for operators based on cost, time and effort and involve significant sources of uncertainty. A few examples include establishing a large database of valid fluid samples across all reservoir benches, identifying representative samples that should be selected to build the EOS model and normalizing the differences between fluid sample analyses across various labs or operators and their quality processes.

Regarding the present disclosure, routinely measured data during flowback may be used to estimate key PVT inputs for all wells. The flowback data for each specific well may be used since it reflects early time flow conditions which are representative of the original reservoir conditions before depletion is experienced. Also, a typical flowback test may have a dedicated individual test separator, which allows more confidence in the measured rates, fluid properties and separator conditions (such as pressure and temperature). Using production data from a later period of time (after flowback) can be erroneous, as often pressures may have reduced below saturation point and production can be allocated across multiple wells flowing to the same central facility, which is not as accurate as a direct production test.

A representative period during flowback may be selected by detecting an interval with steady production gas-oil ratio (GOR). Also, specific gravities for each fluid (oil, gas and water) may be sampled in the same time period. Next, a corrected solution GOR and saturation pressure may be obtained through the equations provided by the present disclosure.

These equations may be derived by applying alternating conditional expectation (ACE), a non-parametric non-linear regression technique, trained on an extensive database of PVT samples from worldwide fields. It may be possible to re-train the solution GOR and saturation pressure equations if sufficient data is available for a given field, although they may be adequate for most fields.

The production GOR may be dependent on the separation process, namely, parameters such as separator pressure and temperature. When separator conditions are not known, either representative field conditions may be used, or a general correction may be applied using the above equations. The saturation pressure may be calculated, with the only additional input of reservoir temperature.

Once the basic PVT properties are known (oil/gas/water specific gravities and solution GOR), the full PVT properties may be represented through the selected modified black-oil correlation of choice.

Bottomhole Pressure

In certain example embodiments, flowing pressure at the downhole "node" in the well (at the depth of reservoir inflow) may be used to represent the well production potential. However, in example unconventional wells, only the wellhead pressure (measured at tubing and/or annulus) may be routinely measured. It may be uncommon to have wells with permanent downhole gauges for the whole production life. Even when gauges are available, such gauges may constitute memory gauges which may only sample limited periods or as a sensor to measure ESP pump intake pressure. Thus, in the absence of continuous measurements, the bottomhole pressure may be calculated from surface data.

Bottomhole pressure (BHP) may be estimated from surface pressure and rate measurements by applying steady-state multiphase flow correlations to capture the pressure losses in the wellbore. The overall pressure losses can be expressed as the sum of the following pressure drop components—static, frictional, acceleration, and any head added by artificial lift (e.g., ESP, rod pump etc.). For gas lifted wells, the effect of gas injection in lightening the density of the liquid column may also modeled below in Equation (1).

$$\Delta P = \Delta P_{static} + \Delta P_{friction} + \Delta P_{acceleration} - \Delta P_{lift} \quad (1)$$

Figure 2:
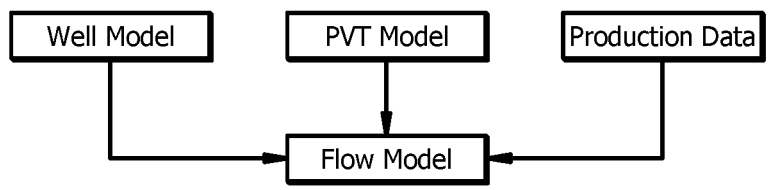
FIG. 2 is an illustration a bottomhole pressure model summary.

The multiphase flow model may combine PVT, wellbore details, and production data, as shown in FIG. 2. The well model may be continuously updated to represent any changes in wellbore configuration and downhole equipment, such as tubing string changes and artificial lift installations. The objective may be to calculate BHP end-to-end, covering all periods in the life of the well.

The BHP calculation may be performed at the resolution at which rate data is captured (through metering, allocation or well tests). The process may be fully automated and applied at field scale to continuously calculate flowing BHP for all wells as part of digitized automatic production surveillance initiatives.

Multiphase flow correlations may not always accurately model the pressure gradients in the well under current operating conditions. In such cases, hybrid modeling approaches combining physics and machine learning may be applied. The objective may be to generate a reliable, continuous estimate of BHP which can be used to further characterize the dynamic production behavior of the system.

Transient Well Performance Analysis

The relevance of Transient Well Performance (TWP) may be that the drainage volume is increasing continuously with time, but the exact geometry is unknown. The diffusive time of flight approach to calculate drainage volume may ensure that no-flow outer boundary and the reservoir withdrawal is known through cumulative volume produced. Under the succession of pseudo-steady state (SPSS) assumption, material balance can be performed at each time step at a high resolution (e.g., daily). This may allow for calculation of pressure depletion (i.e. average reservoir pressure) in the contacted drainage volume at any timestep.

The TWP methodology may use routinely available production rates, combined with the PVT and flowing bottomhole pressure. It may handle variable rate and bottomhole pressure, pressure depletion, variable compressibility, non-linear pressure-dependent PVT properties, and represent both liquid and gas systems producing under any production method (e.g., natural flow, gas lift, ESP, sucker rod pumps etc.).

Example embodiments characterize transient well performance in unconventional wells, using routinely available production rates, combined with the PVT and flowing bottomhole pressures obtained as described in the prior steps. The methodology may combine the concept of diffusive-time-of-flight (DTOF) with material balance theory. Example embodiments may include an optimization routine, which simultaneously may solve the DTOF and material balance methods through an iterative process, considering non-linear pressure-dependent PVT properties. The generated outputs may include continuous estimates of drainage volume, average reservoir pressure and productivity index.

The asymptotic equation to the diffusivity equation in heterogeneous porous media is:

$$\varphi(\vec{x})\mu c_t \frac{\partial p(\vec{x}, t)}{\partial t} = \nabla \cdot \left[ \vec{k}(\vec{x}) \cdot \nabla p(\vec{x}, t) \right] \quad (2)$$

The diffusive time of flight $\tau(\vec{x})$ is physically associated with the peak propagation of a pressure pulse for an impulse source. The 3D diffusivity equation may be reduced to a 1D diffusivity equation, under an assumption that the pressure gradients may be aligned with the time of flight $\tau(\vec{x})$ gradients (i.e., $p(\vec{x}, t) \approx p(\tau(\vec{x}), t)$).

Drainage Volume

Figure 3:
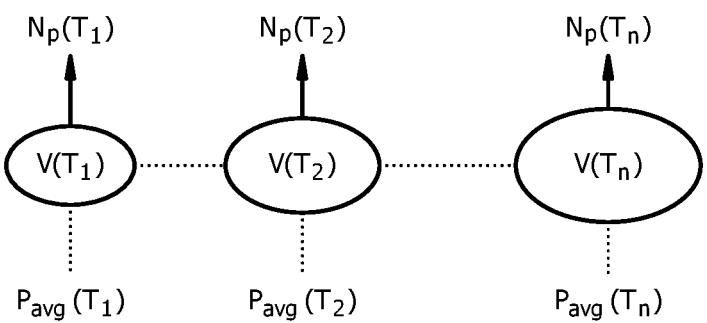
FIG. 3 is an illustration of material balance applied to a succession of pseudo steady state conditions with increasing drainage volumes.

One example starting point may be the drainage volume expression, where the drainage volume is calculated using the pressure and rate data in the absence of a well and reservoir model, as shown below in Equation (3).

$$V_d \approx \frac{1}{c_t \frac{d}{dt_e}(RNP)} \quad (3)$$

where:
$V_d$—drainage volume
$c_t$—total compressibility
RNP—rate-normalized pressure
$t_e$—material balance time The calculated drainage volume in equation (3) represents the contacted reservoir pore volume due to the propagation of the pressure front at any given time step in the reservoir. Analogous to the concept of investigation radius in homogeneous fields, it may track the DTOF contour of an irregular geometry due to the draining of a lumped fracture system and unstimulated matrix. This rate-normalized pressure (RNP) approximation may represent the production behavior that would be observed if the well were produced at a constant reference rate. In equation (3), material balance time and rate-normalized pressure may be calculated as follows:

$$t_e = \frac{Q}{q} \quad (4)$$

$$RNP = \frac{p_i - p_{wf}}{q} \quad (5)$$

where:
Q—cumulative production volume
q—instantaneous production rate
$p_i$—initial reservoir pressure
$p_{wf}$—flowing bottomhole pressure Originally, the DTOF approach may be applicable to single phase flow problems. However, most unconventional reservoirs may produce all three phases (oil, gas and water). The multiphase flow may be approximated, where a total equivalent rate is estimated to recombine all phases into an equivalent single composite phase at reservoir conditions. The total equivalent rate defined in equation (6) (below) is used to estimate material balance time in equation (4) and pressure normalized rate in equation (5), which are applied in equation (3) to determine drainage volume.

$$q_{te} = q_o B_o + q_w B_w + (q_g - q_o R_s) B_g \quad (6)$$

where:
$q_{te}$—total equivalent rate
$q_o$—oil rate
$q_w$—water rate
$q_g$—gas rate
$R_s$—solution gas-oil ratio at pressure of interest
$B_o$—oil formation volume factor at pressure of interest
$B_w$—water formation volume factor at pressure of interest
$B_g$—gas formation volume factor at pressure of interest The total compressibility of the system, which is also required for equation (3), may be estimated from the initial fluid saturations and sampled properties at a given reference pressure. Equation (7), below, assumes that the reservoir is only saturated with oil and water, without the presence of free gas, which is a representative assumption for most liquids-rich unconventional resources.

$$c_t = c_w S_{wi} + c_o (1 - S_{wi}) + c_f \quad (7)$$

where:
$c_t$—total compressibility at pressure of interest
$c_o$—oil compressibility at pressure of interest
$c_w$—water compressibility at pressure of interest
$c_w$—formation compressibility
$S_{wi}$—initial water saturation Material Balance Once drainage volume is known, in certain embodiments, material balance may be continuously applied for each time step to estimate the pressure depletion in the system. Material balance may be valid only during steady-state or pseudo-steady-state conditions, when the well drains a fixed volume (represented as a tank) and all reservoir boundaries have been contacted. However, boundary-dominated conditions may not be reached in unconventional wells; even when the well contacts all fractures, the low permeability matrix is still being incrementally contacted. Example embodiments may therefore assume that transient flow (where the drainage volume is dynamic and continuously increasing) can be approximated as "snapshots" or succession of instantaneous pseudo-steady states, as shown in FIG. 3. The drainage volume, calculated in equation (3), defines the size of the "tank" in each time step. As volume is taken out of the system, loss of energy may be estimated in the contacted drainage volume, which is manifested as reservoir depletion.

Example embodiments may utilize an expanding control volume approach. Assuming that transient flow (where the drainage volume is dynamic and continuously increasing) can be approximated as "snapshots" or succession of instantaneous pseudo-steady states (i.e. transient states represented as a series of consecutive pseudo-steady states for small time intervals), as shown in FIG. 3. The drainage volume may define the size of the "container" in each time step. By determining drainage volume based on DTOF, there is no flow into the container at each timestep. But of the volume taken out of the system through production at the well is known. By applying material balance, loss of energy may be estimated in the contacted drainage volume, which is manifested as reservoir depletion. Cumulative production may be tracked daily in the field and these small timesteps may improve the accuracy of the material balance.

The general material balance expression may alternatively be represented as shown below in Equation (8):

(Liquid expansion)+(Liberated gas expansion)+ (Change in pore volume due to connate water/ residual oil expansion and pore volume reduction)=(Underground withdrawal) (8)

Using first principles, each term can be derived to obtain a representative material balance expression for an oil-producing unconventional well in the absence of free gas cap and aquifer in the reservoir. The liquid expansion term is defined as:

$$N(B_o - B_{oi}) + W(B_w - B_{wi}) \quad (9)$$

where:
N—total oil volume originally in place
W—total water volume originally in place
$B_o$—oil formation volume factor at pressure of interest
$B_{oi}$—oil formation volume factor at initial reservoir pressure
$B_w$—water formation volume factor at pressure of interest $B_{wi}$—water formation volume factor at initial reservoir pressure The liberated gas expansion term is defined as:

$$N(R_{si}-R_s)B_g \quad (10)$$

where:
N—total oil volume originally in place
$R_{si}$—initial solution gas-oil ratio
$R_s$—solution gas-oil ratio at pressure of interest
$B_g$—gas formation volume factor at pressure of interest The change in pore volume due to the expansion of connate water and residual oil, and pore volume reduction, may be derived as follows:

$$dPV = -dV_w - dV_o + dV_F = -(c_w V_w + c_o V_o + c_F V_F)\Delta P \quad (11)$$

where oil, water and pore volumes are defined as $$V_o = \frac{(NB_{oi} + WB_{wi})S_{or}}{1 - S_{wc} - S_{or}} \quad (12)$$

$$V_w = \frac{(NB_{oi} + WB_{wi})S_{wc}}{1 - S_{wc} - S_{or}} \quad (13)$$

$$V_F = \frac{NB_{oi} + WB_{wi}}{1 - S_{wc} - S_{or}} \quad (14)$$

By combining equations (12), (13) and (14) into equation (11), the resultant Equation (15) may be determined:

$$-dPV = (NB_{oi} + WB_{wi})\left(\frac{S_{wc}c_w + S_{or}c_o + c_F}{1 - S_{wc} - S_{or}}\right)\Delta p \quad (15)$$

where:
dPV—total change in pore volume
$dV_w$—expansion in connate water volume
$dV_o$—expansion in residual oil volume
$dV_F$—reduction in pore volume due to formation compressibility
$S_{wc}$—connate water saturation
$S_{or}$—residual oil saturation
$\Delta p$—reduction in reservoir pressure due to depletion
N—total oil volume originally in place
W—total water volume originally in place The last term in the material balance equation, underground withdrawal, is obtained from the cumulative produced volumes, calculated as follows.

$$N_p[B_o + (R_p - R_s)B_g] + W_p B_w \quad (16)$$

where:
$N_p$—cumulative oil production
$W_p$—cumulative water production
$R_p$—cumulative gas-oil ratio (calculated as cumulative gas divided by cumulative oil)
$R_s$—solution gas-oil ratio at pressure of interest
$B_o$—oil formation volume factor at pressure of interest
$B_g$—gas formation volume factor at pressure of interest
$B_w$—water formation volume factor at pressure of interest A closure relationship for material balance relating oil (N) and water (W) volumes originally in place may be needed. However, in certain embodiments, only a total drainage volume combining all phases, as defined in equation (3), may be known or calculated. It may therefore be necessary to split the drainage volume into oil and water components, which may be done by defining ω, the ratio of water to oil in place volumes, as shown in Equation (17). The ratio ω can be directly provided as an input, from volumetrics, or it can also be approximated from PVT and petrophysical properties, as defined in equation (18).

$$\omega = \frac{WB_{wi}}{NB_{oi}} \quad (17)$$

$$\omega \approx \frac{(S_w - S_{wc})B_{wi}}{(1 - S_w - S_{or})B_{oi}} \quad (18)$$

Equation (19) may be derived by combining equations (9), (10), (15), (16) and (18) into equation (8) for the final material balance expression, which may be solved for the pressure change representing reservoir depletion.

$$\Delta p = \left(\frac{1 - S_{wc} - S_{or}}{S_{wc}c_w + S_{or}c_o + c_F}\right)\left\{\frac{N_p[B_o + (R_p - R_s)B_g] + W_p B_w}{V_d} - \left(\frac{1}{1+\omega}\right)\left[\frac{(B_o - B_{oi}) + (R_{si} - R_s)B_g}{B_{oi}} + \frac{\omega(B_w - B_{wi})}{B_{wi}}\right]\right\} \quad (19)$$

The delta-pressure in equation (19) represents the reservoir pressure drop from initial pressure:

$$\Delta_p = p_i - p_{avg} \quad (20)$$

where:
$p_i$—initial reservoir pressure
$p_{avg}$—average reservoir pressure

The average reservoir pressure represents the volumetric-averaged pressure in the contacted drainage volume at any instantaneous time, and it may approximate the depletion in the reservoir due to production.

Equation (19) can be re-arranged to solve for drainage volume ($V_d$):

$$V_d = \frac{N_p[B_o + (R_p - R_s)B_g] + W_p B_w}{\frac{(B_o - B_{oi}) + (R_{si} - R_s)B_g}{(1+\omega)B_{oi}} + \left(\frac{\omega}{1+\omega}\right)\frac{(B_w - B_{wi})}{B_{wi}} + \left(\frac{S_{wc}c_w + S_{or}c_o + c_F}{1 - S_{wc} - S_{or}}\right)\Delta p} \quad (21)$$

Equations (3) through (21) may represent the steps involved in the workflow to estimate drainage volume and reservoir pressure depletion, the main metrics to capture transient well performance.

Figure 4:
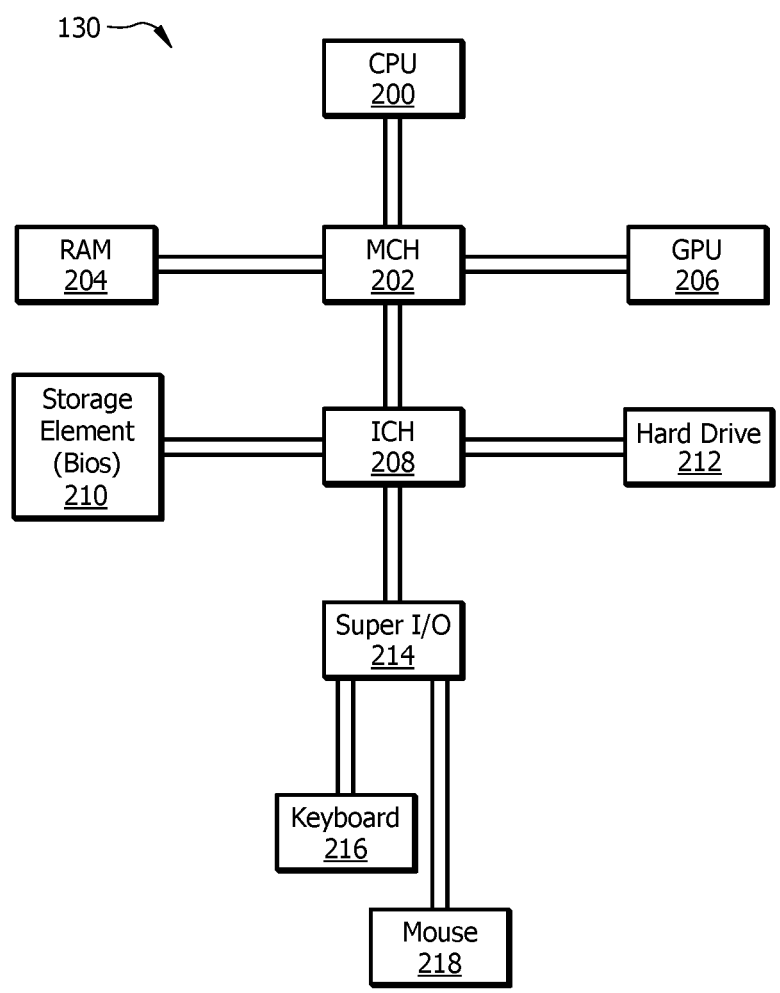
FIG. 4 is an illustration of a control system.

FIG. 4 is a diagram illustrating an example control system 130, according to aspects of the present disclosure. A processor or central processing unit (CPU) 200 of the control system 130 is communicatively coupled to a memory controller hub or north bridge 202. The processor 200 may include, for example, a microprocessor, microcontroller, digital signal processor (DSP), application specific integrated circuit (ASIC), or any other digital or analog circuitry configured to interpret and/or execute program instructions and/or process data. Processor 200 may be configured to interpret and/or execute program instructions or other data retrieved and stored in any memory such as memory 204 or hard drive 212. Program instructions or other data may constitute portions of a software or application for carrying out one or more methods described herein. Memory 204 may include read-only memory (ROM), random access memory (RAM), solid state memory, or disk-based memory. Each memory module may include any system, device, or apparatus configured to retain program instructions and/or data for a period of time (e.g., computer-readable non-transitory media). For example, instructions from a software or application may be retrieved and stored in memory 204 for execution by processor 200.

Modifications, additions, or omissions may be made to FIG. 4 without departing from the scope of the present disclosure. For example, FIG. 4 shows a particular configuration of components of control system 130. However, any suitable configurations of components may be used. For example, components of control system 130 may be implemented either as physical or logical components. Furthermore, in some embodiments, functionality associated with components of control system 130 may be implemented in special purpose circuits or components. In other embodiments, functionality associated with components of control system 130 may be implemented in configurable general-purpose circuit or components. For example, components of control system 130 may be implemented by configured computer program instructions.

Memory controller hub (MCH) 202 may include a memory controller for directing information to or from various system memory components within the control system 130, such as memory 204, storage element 210, and hard drive 212. The memory controller hub 202 may be coupled to memory 204 and a graphics processing unit (GPU) 206. Memory controller hub 202 may also be coupled to an I/O controller hub (ICH) or south bridge 208. I/O controller hub 208 is coupled to storage elements of the control system 130, including a storage element 210, which may comprise a flash ROM that includes a basic input/output system (BIOS) of the computer system. I/O controller hub 208 is also coupled to the hard drive 212 of the control system 130. I/O controller hub 208 may also be coupled to a Super I/O chip 214, which is itself coupled to several of the I/O ports of the computer system, including keyboard 216 and mouse 218.

In certain embodiments, the control system 130 may comprise at least a processor and a memory device coupled to the processor that contains a set of instructions that when executed cause the processor to perform certain actions. In any embodiment, the control system 130 may include a non-transitory computer readable medium that stores one or more instructions where the one or more instructions when executed cause the processor to perform certain actions. As used herein, a control system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, a control system may be a computer terminal, a network storage device, or any other suitable device and may vary in size, shape, performance, functionality, and price. The control system 130 may include random access memory (RAM), one or more processing resources such as a central processing unit (CPU) or hardware or software control logic, read only memory (ROM), and/or other types of nonvolatile memory. Additional components of the control system 130 may include one or more disk drives, one or more network ports for communication with external devices as well as various input and output (I/O) devices, such as a keyboard, a mouse, and a video display. The control system 130 may also include one or more buses operable to transmit communications between the various hardware components.

Figure 5:
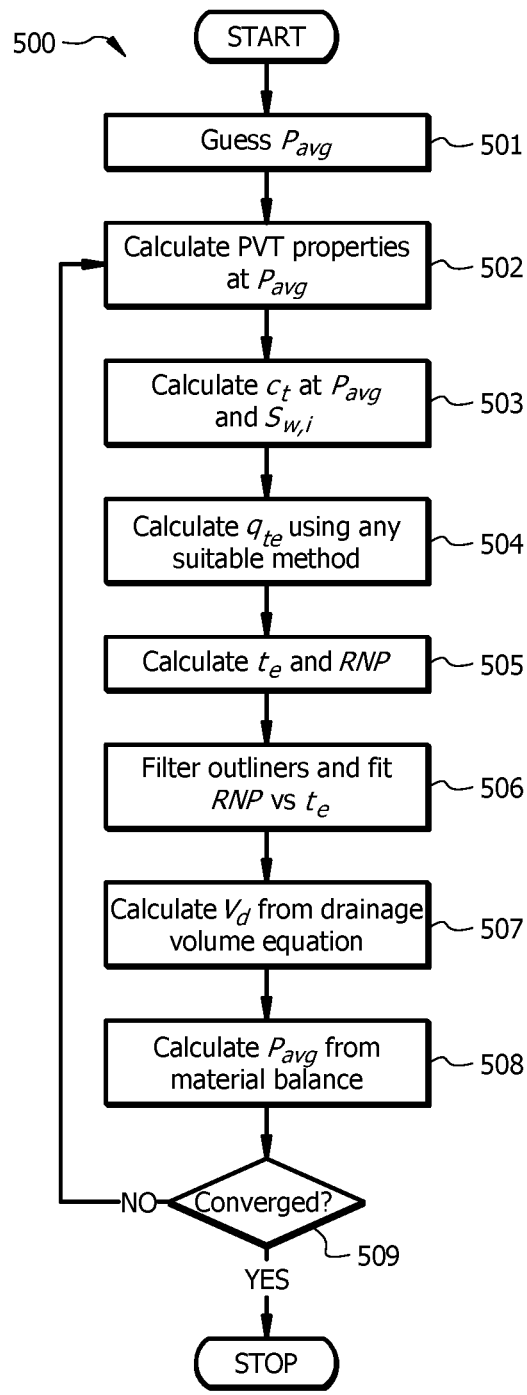
FIG. 5 is a flow chart of an example method to calculate drainage volume and average reservoir pressure depletion.

The following steps, as shown in FIG. 5, outline an embodiment of a method of the present disclosure 500 that may incorporate pressure dependent PVT properties (e.g., formation volume factor, compressibility, and solution GOR). At step 501, a processor 200 (referring to FIG. 4) of control system 130 (referring to FIG. 4) may determine an average reservoir pressure ($P_{avg}$) for all evaluated time steps as a function of cumulative liquid production, as an initial guess. The reservoir pressure trend may start from initial reservoir pressure and be monotonically decreasing. At step 502, the processor 200 (referring to FIG. 4) of control system 130 (referring to FIG. 4) may calculate all required PVT properties (e.g., $B_o$, $B_g$, $B_w$, $R_s$, $c_o$, $c_w$) at each input pressure value. At step 503, the processor 200 may further determine total compressibility ($c_t$) for all given pressures from equation (7), with initial water saturation ($S_{w,i}$) may be assumed that the average water saturation does not change in time). At step 504, the processor 200 of control system 130 may calculate the total equivalent rate ($q_{te}$) at all evaluated pressures, for example using the Perrine-Martin method from equation (6) and/or any other suitable method or equation. At step 505, the processor 200 of control system 130 may determine the material balance time ($t_e$) and rate-normalized pressure (RNP) with equations (4) and (5). At step 506, processor 200 of control system 130 may apply filters to eliminate outliers and fit RNP vs $t_e$ with a hyperbolic equation. At step 507, the processor 200 of control system 130 may calculate drainage volume ($V_d$) using equation (3) with the smoothened RNP vs $t_e$ trend. At step 508, the processor 200 of control system 130 may determine average reservoir pressure using equations (19) and (20). The required w parameter can either be provided as a direct input or estimated with equation (18). If the average reservoir pressure converges, the method 500 may terminate.

GOR Modeling

In some embodiments, the method of modelling GOR of the present disclosure may be a two-step procedure. First, the control system 130 may detect the inflection point up to which gas produced is only the solution gas using an automated curve-fitting routine based on physics-based constraints. This may identify the point until which the GOR is equal to the initial solution gas-oil ratio. Once identified, this point may be required in the next step to help set the constraint of the first point from which the history-match procedure should be carried out. The second step may be a stepwise history-matching procedure based on a hybrid reduced-physics model in the form of material balance equation derived above. The methods of the present disclosure may handle changing artificial lift strategies and hence changing bottom hole pressure conditions.

Step 1: Automatic Identification of Inflection Point

The first step in the workflow may be to identify the point, i.e., the date or cumulative volume, until which the gas produced is the solution gas and no free gas has been evolved in the formation. In certain embodiments, this process may be automated to scale and adapted to work for any well of interest. To address this, an empirical approach of plotting cumulative oil and cumulative gas on a log-log scale may be used as it exhibits distinct straight-line behavior with physical meaning.

At an initial time period, the cumulative gas may be linearly proportional to cumulative oil, as the gas-oil ratio is constant and equal to the initial solution GOR.

$$\log G_p = \log N_p + \log R_{si} \tag{22}$$

where:
$G_p$—cumulative oil production
$N_p$—cumulative oil production
$R_{si}$—initial solution gas-oil ratio In this period, the slope may be equal to 1 in the log-log plot and the production GOR is equal to a constant initial solution GOR, as defined in the PVT model.

$$GOR = R_{si} \quad (23)$$

Figure 6:
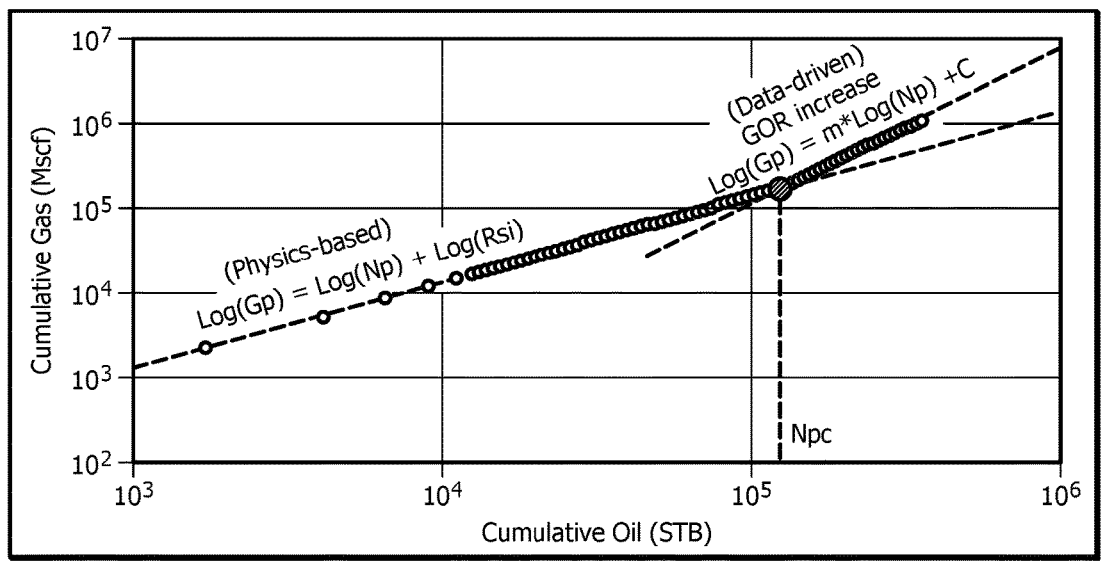
FIG. 6 is a plot of cumulative gas (Go) vs cumulative oil (No) that depicts an inflection point.

As the reservoir depletes and reservoir pressure drops below saturation pressure, the well may transition to a second trend, where GOR increases. This is shown as a second linear trend in the log-log plot, with slope larger than 1. This transition point is what is defined as the inflection point as shown in FIG. 6. In this embodiment, it may become a piecewise straight line fitting exercise on two distinct trends and the intersection point of the two lines is can be defined as an inflection point. Thus, a curve fitting procedure may be employed with predefined constraints of fitting 2 straight lines with the first line slope set to 1 due to the physics informed knowledge as shown in equation (23). Thus, the unknowns may be the x and y coordinates of the inflection point and the slope of the second line. This may be solved as an optimization problem to fit the actual data which results in solving for the inflection point coordinates and the slope of line after the inflection point.

However, these wells do not always exhibit a constant slope after inflection and the slopes may change depending on changing operational conditions such as artificial lift installation, which often changes the bottom hole pressure profile trend of a well significantly. Thus, if the trend line is required to have only two distinct slopes, the algorithm may fail to detect the correct inflection point. To resolve this issue, one example embodiment of this disclosure may fit the straight lines only until the first artificial lift install date or until any other first major change in the well's operating conditions. This may ensure that there exists only two distinct slope lines and a curve fitting procedure can be employed. If there is no major operating condition change or artificial lift installed, historical production data may be considered. The constraints to curve fitting process may be adapted to handle scenarios where a well if brought on artificial lift before the inflection point, full history or data until the next installed artificial lift, if available, may be considered for piecewise linear fit process.

Figure 7:
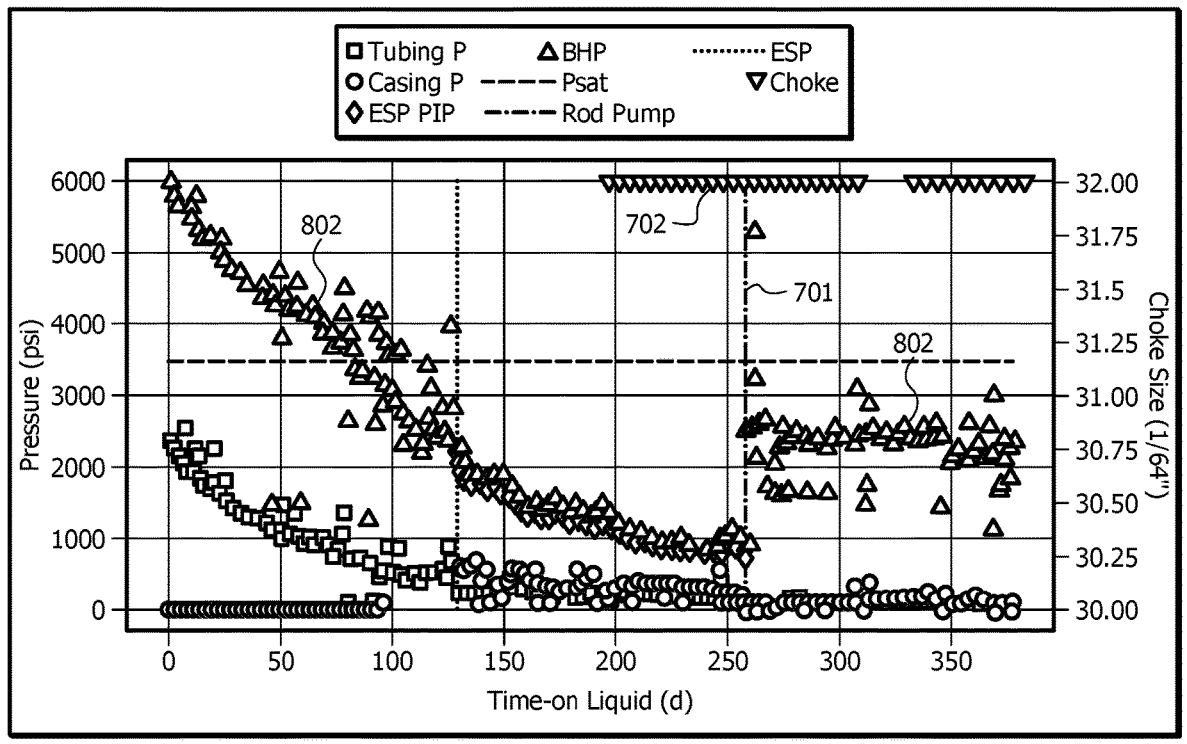
FIG. 7 is a plot of BHP trend of a well before and after artificial lift installation.

FIG. 7 depicts the BHP trend of two field wells that illustrates how BHP profile may change after the installation of an artificial lift. The vertical line 701 shows the point when an ESP was installed, and the line 702 shows the time when a sucker rod pump (SRP) was installed.

Figure 8A:
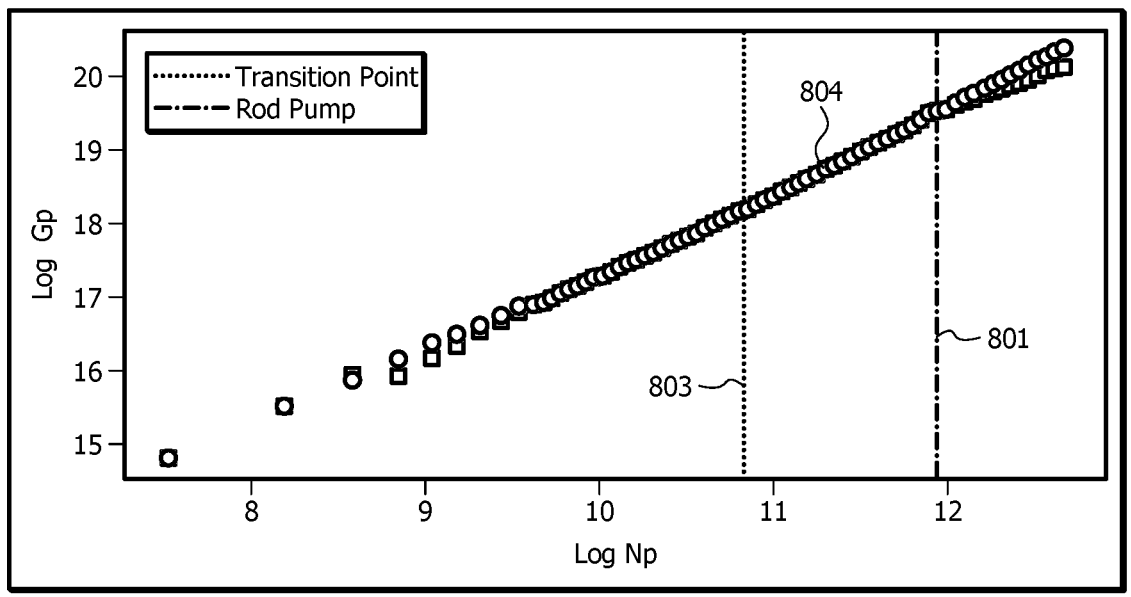
FIGS. 8A-8C are a series of plots showing trends when an artificial lift is installed after the inflection point.
Figure 8B:
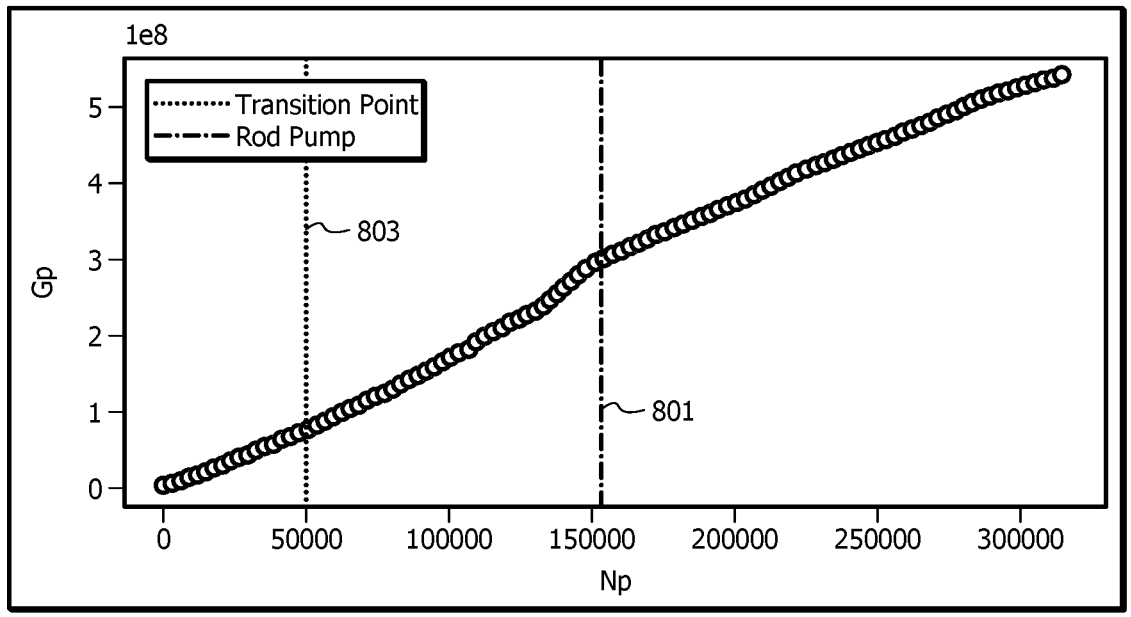
Figure 8C:
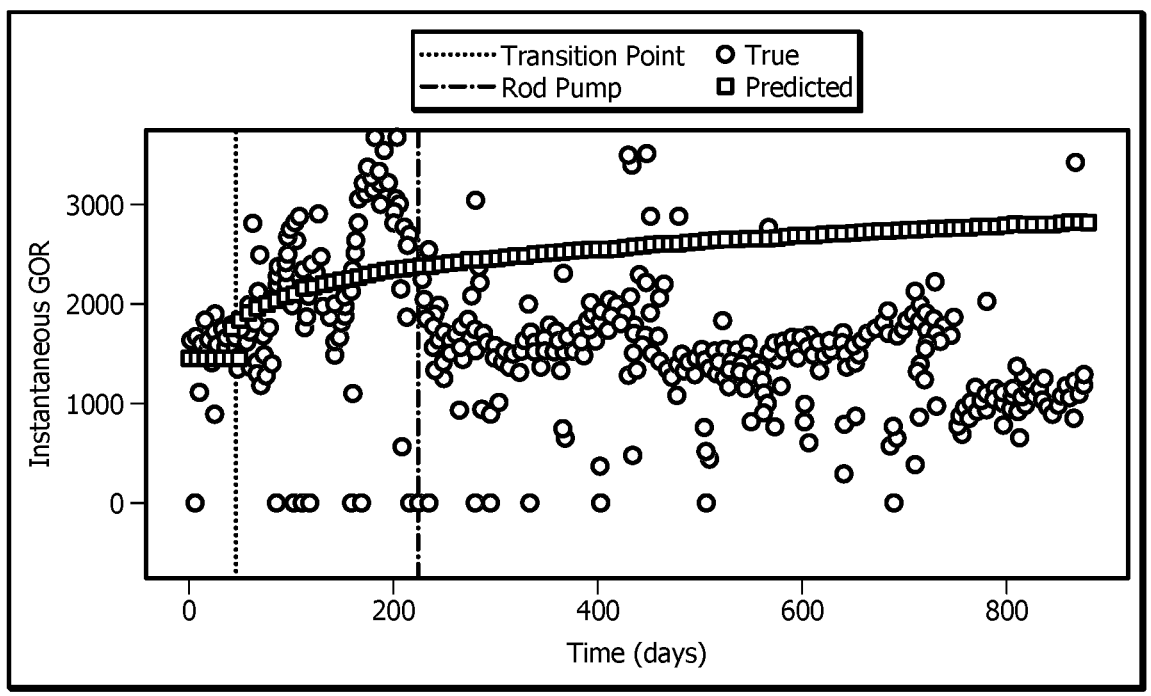

As can be seen in FIG. 8A, the true $G_p$ vs $N_p$ data on a log-log scale shows multiple linear trends with another distinct trend after artificial lift (rod pump) is installed as shown by the vertical line 801. The examples shown in FIGS. 8A-8C illustrate the linear trends after artificial lift is installed. Thus, with the example strategy described above, the only data taken up is data up to the artificial lift install date for piecewise linear fit as shown in the same FIG. 8A by points 802. The inflection point detected is shown by the vertical line 803 in the same plot. When comparing against the instantaneous GOR plot, the optimal solution obtained for the inflection point agrees with manual validation. The result is a flat GOR before the inflection and an increase in GOR afterwards. The slope of the line 804 after the inflection point in this embodiment increases to 1.2.

Figure 9A:
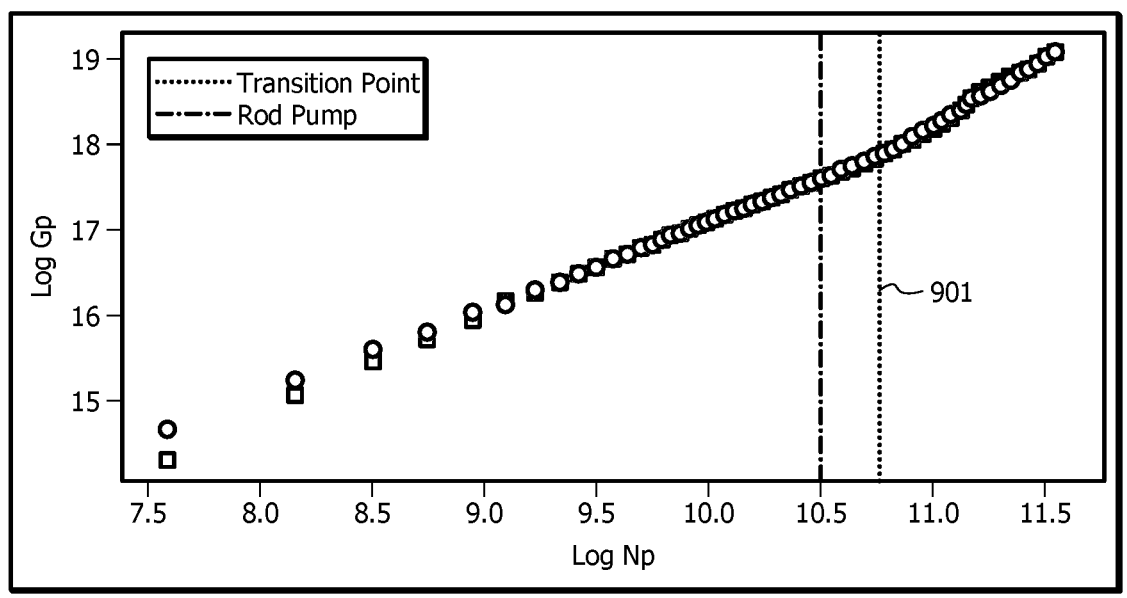
FIGS. 9A-9C are a series of plots showing trends when an artificial lift is installed before the inflection point.
Figure 9B:
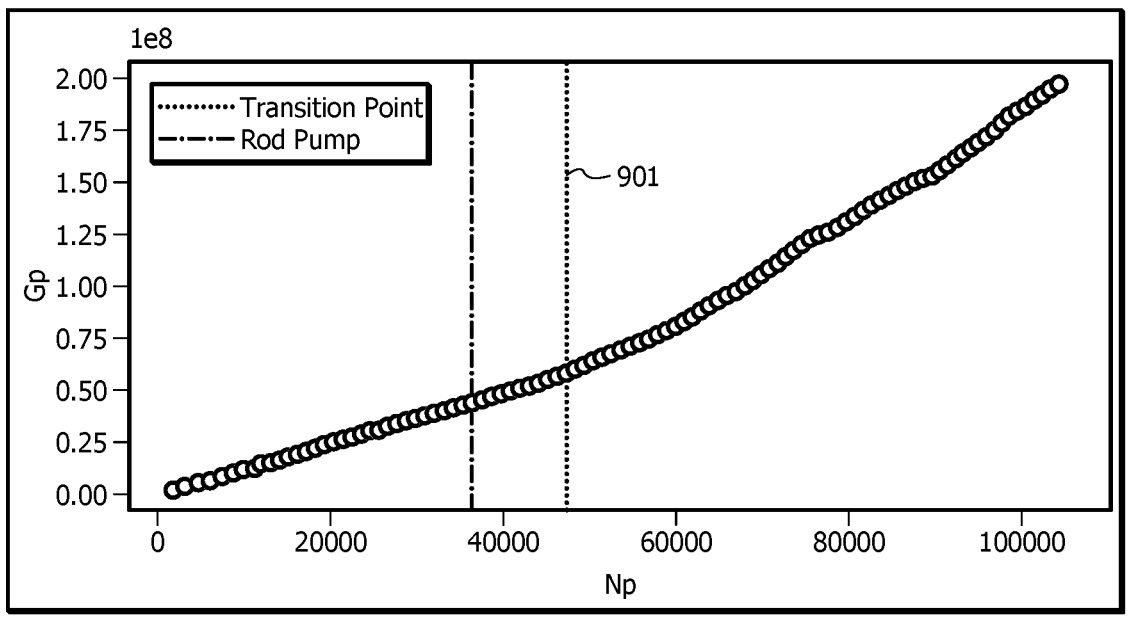
Figure 9C:
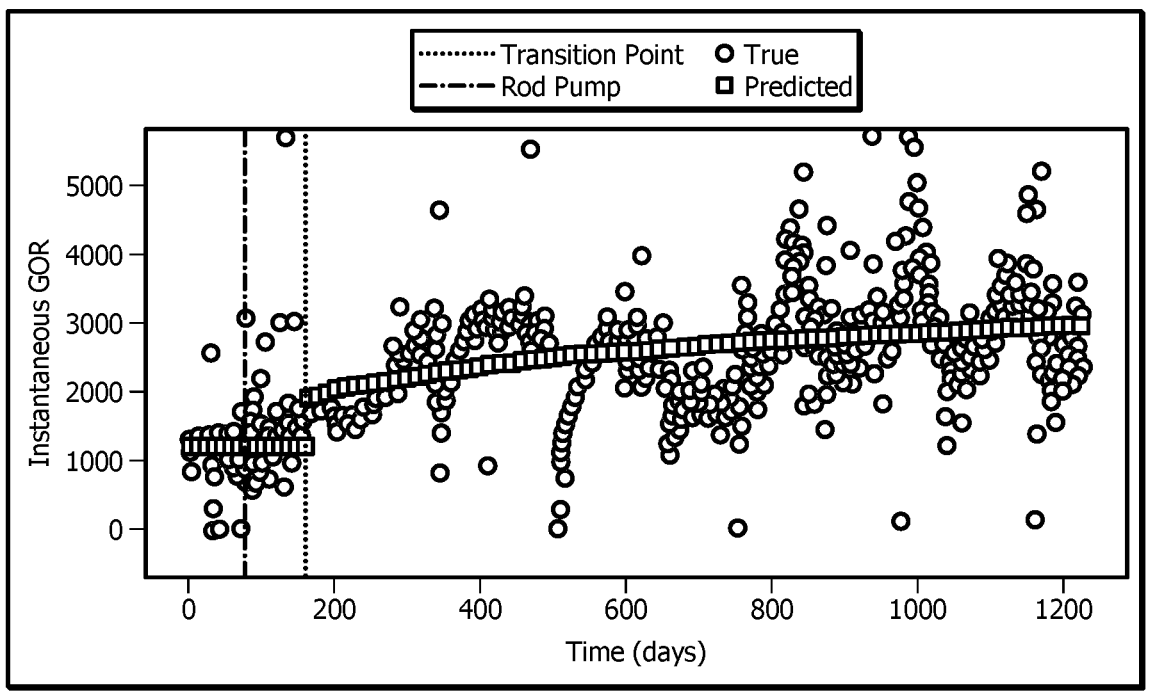

The examples in FIGS. 9A-9C illustrate a scenario when the artificial lift may be installed very early in the life of the well before the inflection point 901. The constraints in the algorithm may be adapted to handle such scenarios by considering the full history for piecewise fits. The instantaneous GOR looks flat until the inflection point 901 and the slope of the fitted line increases to 1.4 after the inflection point 901 that validates the accuracy of inflection point detection.

Step 2: History Match Cumulative GOR after Inflection

Once the inflection point is identified, the next step may be to model GOR behavior after the inflection point. An example embodiment captures the behavior of how GOR evolves with changing pressure/operating conditions, PVT properties and production data. This may be achieved with the material balance formulation based on the dynamic drainage volume derived above. That material balance rearranged in terms of $R_p$, the cumulative GOR of a well, yields Equation (24), shown below. The formulation may depend on PVT properties, production data, reservoir properties, drainage volume and drawdown at a given time. The only unknown in this equation may be average reservoir pressure as other properties are either the observed data or obtained as part of the well performance analysis (WPA) workflow, such as PVT properties and BHP. This may be a proxy model for cumulative GOR which is based on the concept of transient drainage volume. A history matching problem may be formulated to match cumulative GOR profile of a well by solving for average reservoir pressure.

$$R_p = R_s + \frac{V_d}{N_p B_g B_{oi}} \left[ \omega \frac{(B_w - B_{wi})B_{oi}}{B_{wi}} + \frac{(R_{si} - R_s)B_g + (B_o - B_{oi}) +}{(1 - S_{wc} - S_{or})} (1 + \omega)B_{oi}\Delta p \right] - \frac{W_p B_w}{N_p B_g} - \frac{B_o}{B_g} \quad (24)$$

$R_p \rightarrow$ Cumulative Gas Oil Ratio

The objective may be to history match the observed data, which contains information on both observed oil and gas cumulative rates, to obtain a pressure solution.

$$\min_{\overline{P}} \| R_{p_{obs}} - R_{p_{calc}} \| \quad (25)$$

The minimization algorithm used here may be differential evolution, which is a gradient-free optimizer that optimizes a problem by iteratively trying to improve a candidate solution, i.e., average pressure, with respect to the objective function defined above. The average pressure profile may be constrained to follow a hyperbolic decline as a function of cumulative oil volume. In certain embodiments, this is a useful feature for PI-based forecasting, as will be discussed in the next sections. The forward model here, which is the material balance equation, may be timely and efficient.

A step-wise history matching procedure may be employed to account for abrupt changes in the bottom hole pressure profile encountered due to changes in the well configuration, such as installation of artificial lifts. In the first step, $R_p$ may be history matched between the inflection point as predicted in step 1 and artificial lift installation. An average pressure profile until artificial lift may be used that best matches the true cumulative GOR. In the subsequent step, a new average pressure profile after artificial lift may be solved to history match the cumulative GOR after the installation date while keeping the converged pressure solution until artificial lift. FIG. 10C shows an example well with history-matched cumulative GOR as shown by the predicted and true values.

Figure 10A:
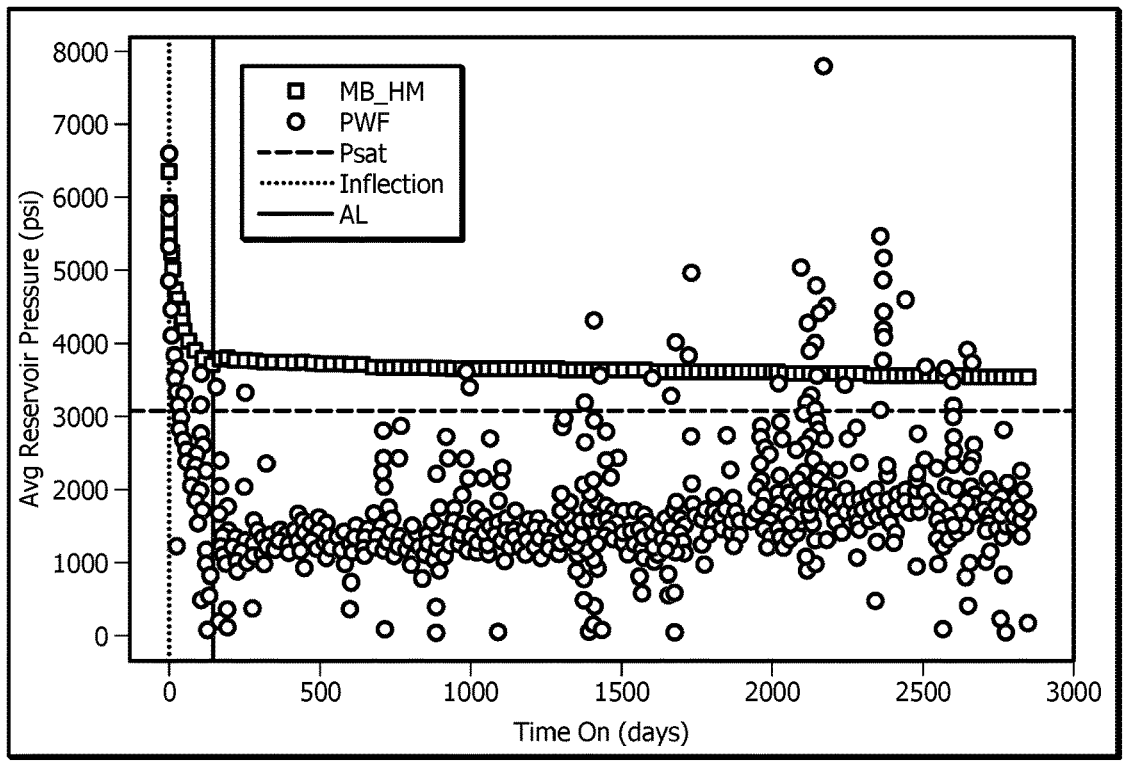
FIGS. 10A-10C are a series of plots depicting a step-wise history matching procedure for a well.
Figure 10B:
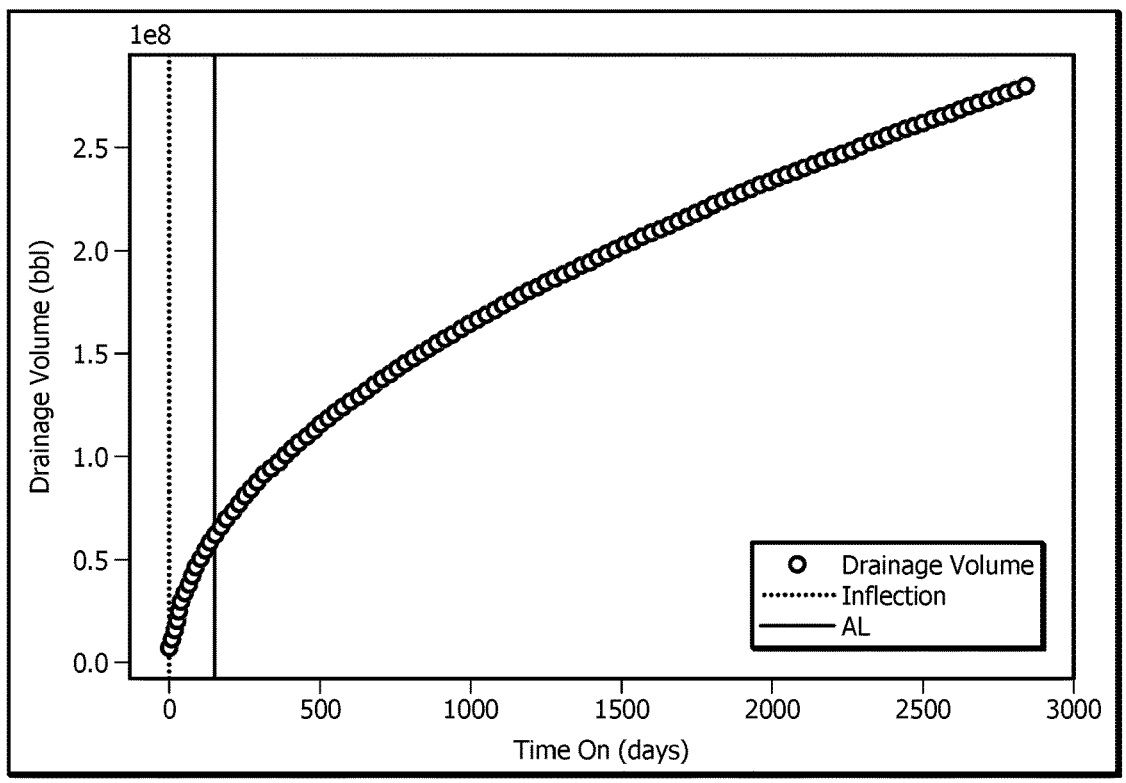
Figure 10C:
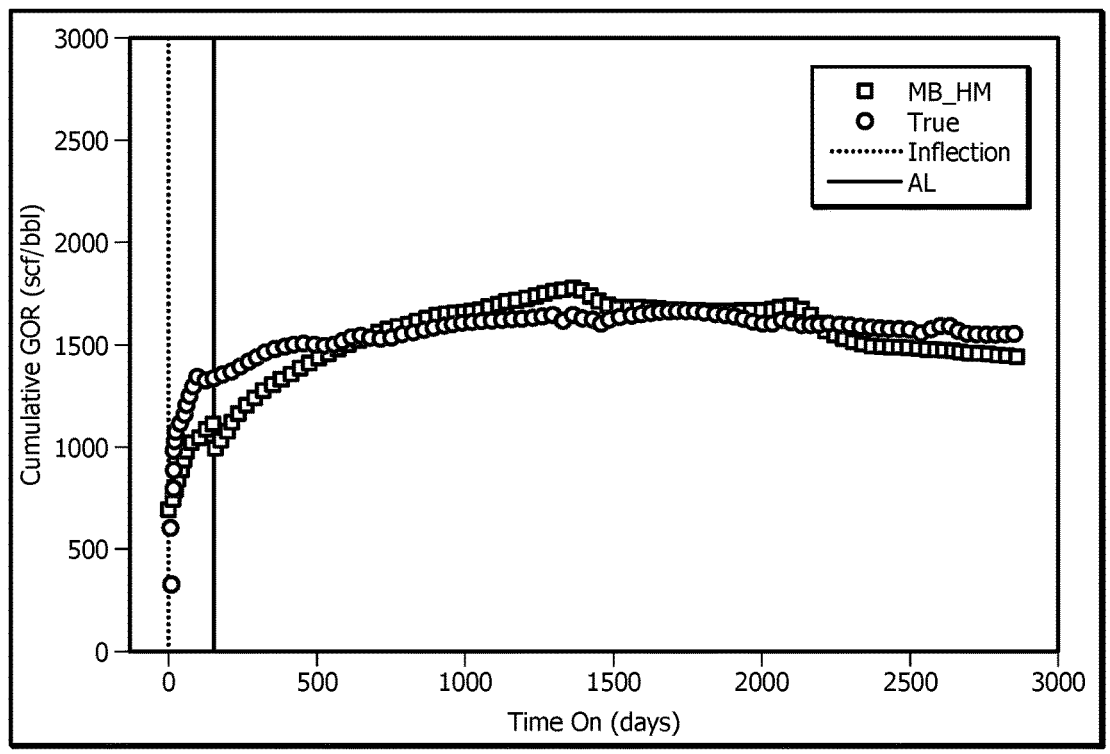
Figure 11A:
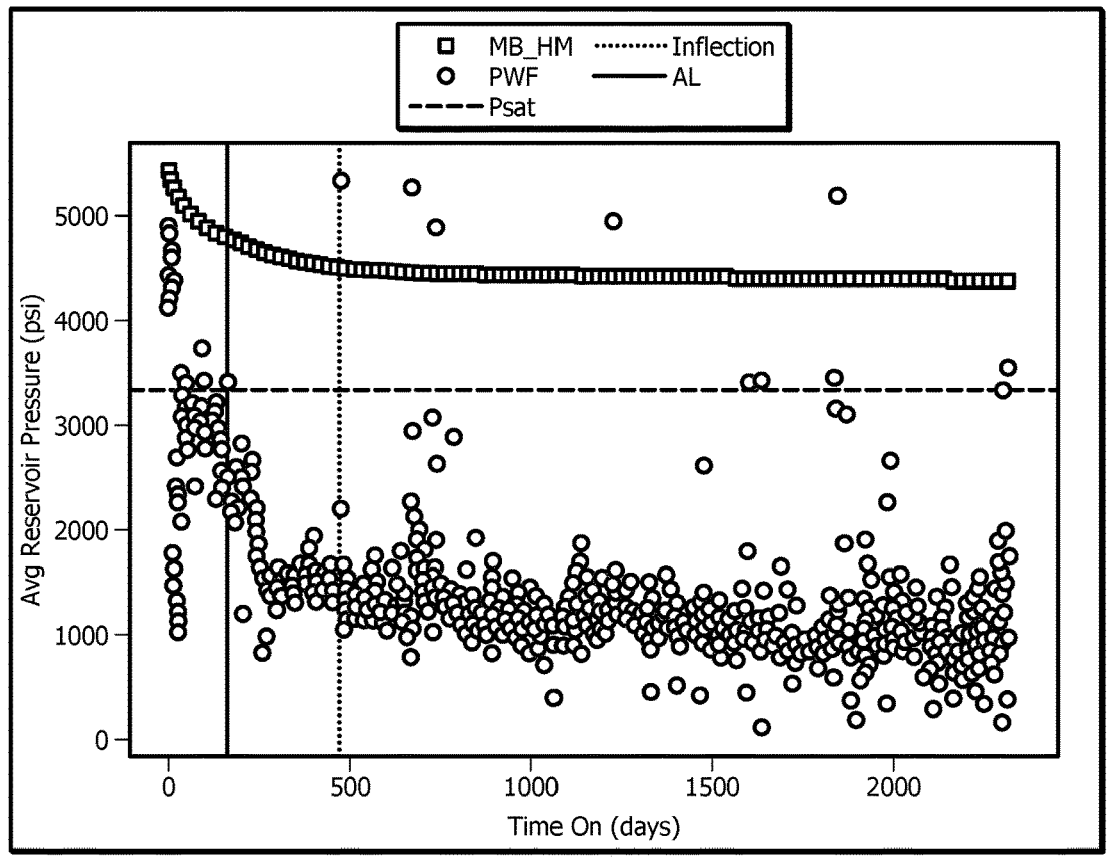
FIGS. 11A-11C are a series of plots depicting a step-wise history matching procedure for a well.
Figure 11B:
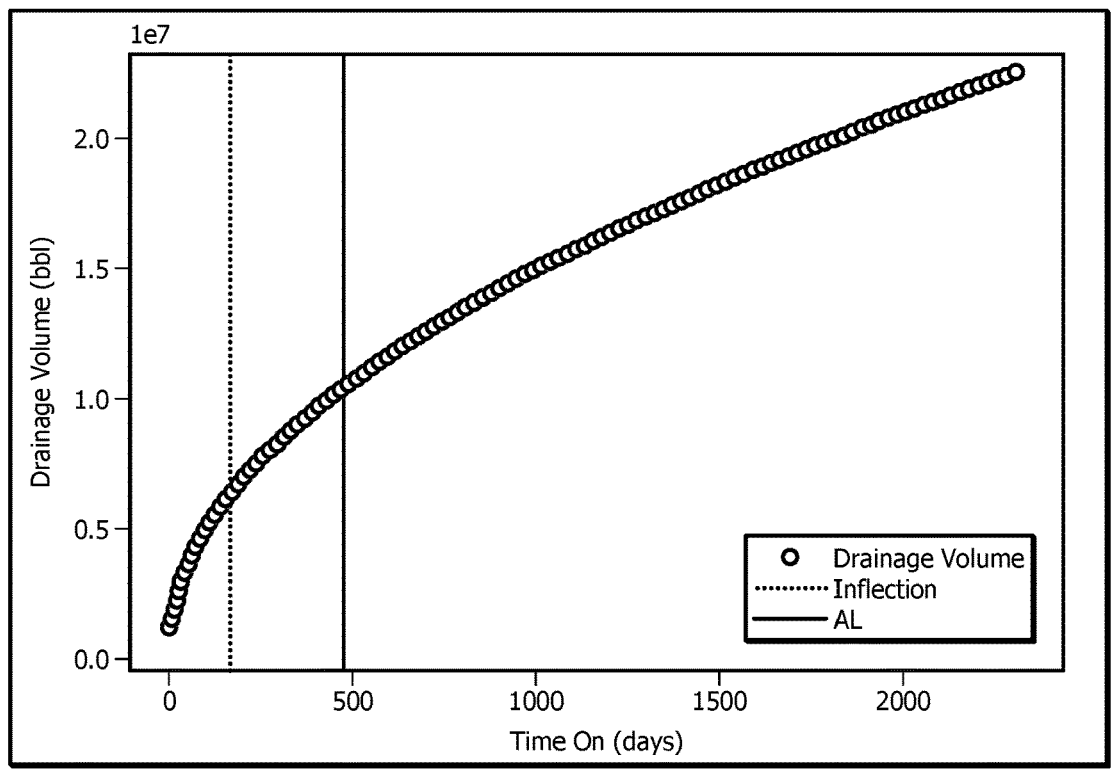
Figure 11C:
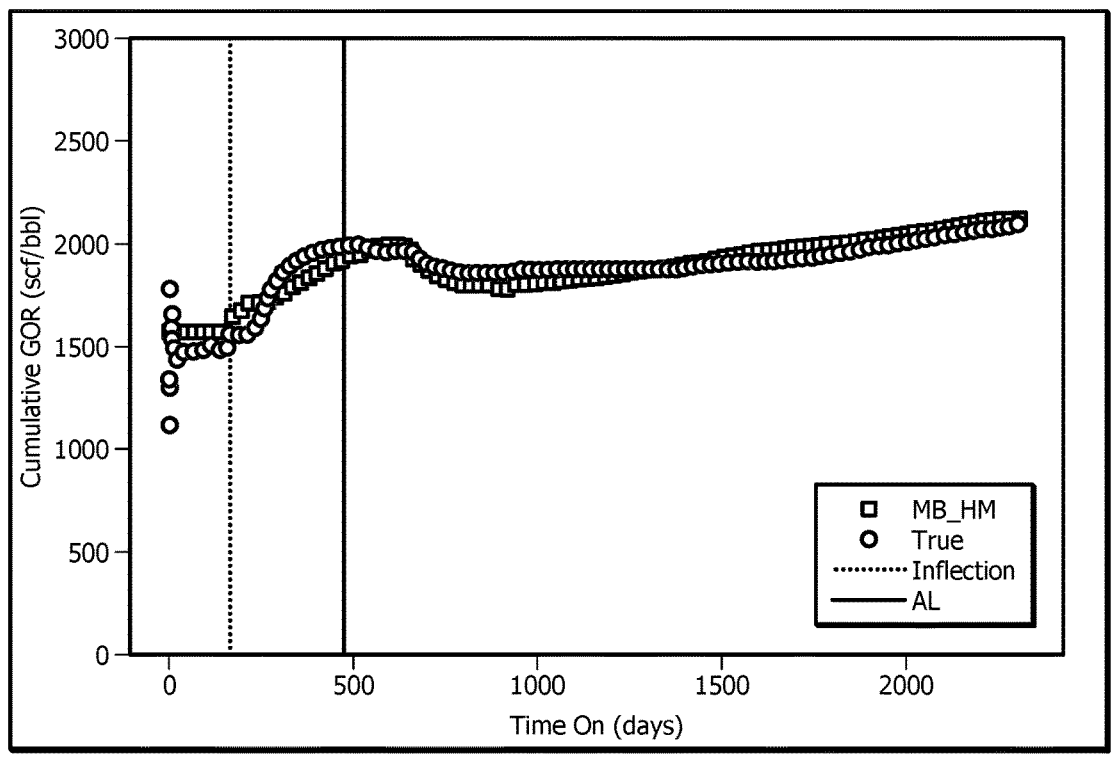

The optimal average reservoir pressure profile is shown in FIG. 10a that provides the best history match. FIG. 10B shows the drainage volume profile obtained at the optimal average pressure solution. FIGS. 11A-11C shows a similar example with another well. The formulation of the present disclosure may provide an average reservoir pressure solution that captures the GOR behavior.

With a physical model that represents GOR, the next step may be to forecast oil and water rates first, since the GOR equation depends on $N_p$ and $W_p$. Thus, having the oil and water forecast may enable forecasting cumulative GOR based on the equation (24).

Instantaneous Recovery Ratio

Instantaneous recovery ratio (IRR) can be defined as the recovery factor at a given moment in time, given the producing rates and contacted drainage volume, which is a useful diagnostic metric that estimates completion effectiveness.

$$IRR = \frac{Q_{te}}{V_d} \quad (26)$$

where:
 IRR—instantaneous recovery ratio at evaluated time step
 $V_d$—drainage volume at evaluated time step
 $Q_{te}$—cumulative total equivalent volume (Perrine-Martin method) at evaluated time step Productivity Index In certain example embodiments, the productivity index (PI) defines a representative metric of well performance and the true reservoir inflow potential. It may normalize the production volumes by the flowing pressures and may incorporate the impact of pressure depletion and PVT. It may be an effective diagnostic metric as it may allow consistent comparison of wells experiencing different operating conditions, such as different choke openings or artificial lift, mitigating biases often encountered in rate-time based type curves. Also, by representing the relationship between rates and pressure drawdown, PI can be used for production optimization purposes, to predict current and future production given various operational strategies.

Productivity index may depend on the producing rates, flowing bottomhole pressure and average reservoir pressure. For conventional reservoirs, PI can be considered as constant under pseudo-steady state flow. However, in certain embodiments (e.g., unconventional reservoirs), PI may be treated as a transient quantity that is updated at each timestep.

For a given reservoir condition at any time instance, PI may depend on the actual drawdown and may comprise a constant magnitude only when flowing pressure is above saturation pressure. When flowing pressure drops below saturation pressure, the gas liberation reduces the overall liquid productivity (PI) due to relative permeability changes. Equations (27), (28) and (29), based on the IPR equations, can be solved to define the liquid PI at any given time step, given the pressure conditions.

When both the reservoir and flowing BHP are above saturation pressure (undersaturated), the PI is defined as a simple linear equation. Note that all terms on the right-hand side vary with time.

$$q_l = PI^*(p_{avg} - p_{wf}) \quad (27)$$

If the reservoir is still undersaturated, but the flowing bottomhole pressure drops below saturation pressure (created saturated conditions in the near-wellbore region), the following expression is used.

$$q_l = PI^*(p_{avg} - p_{sat}) + \left(\frac{PI * p_{sat}}{1.8}\right) * \left[1 - 0.2\frac{p_{wf}}{p_{sat}} - 0.8\left(\frac{p_{wf}}{p_{sat}}\right)^2\right] \quad (28)$$

Figure 12A:
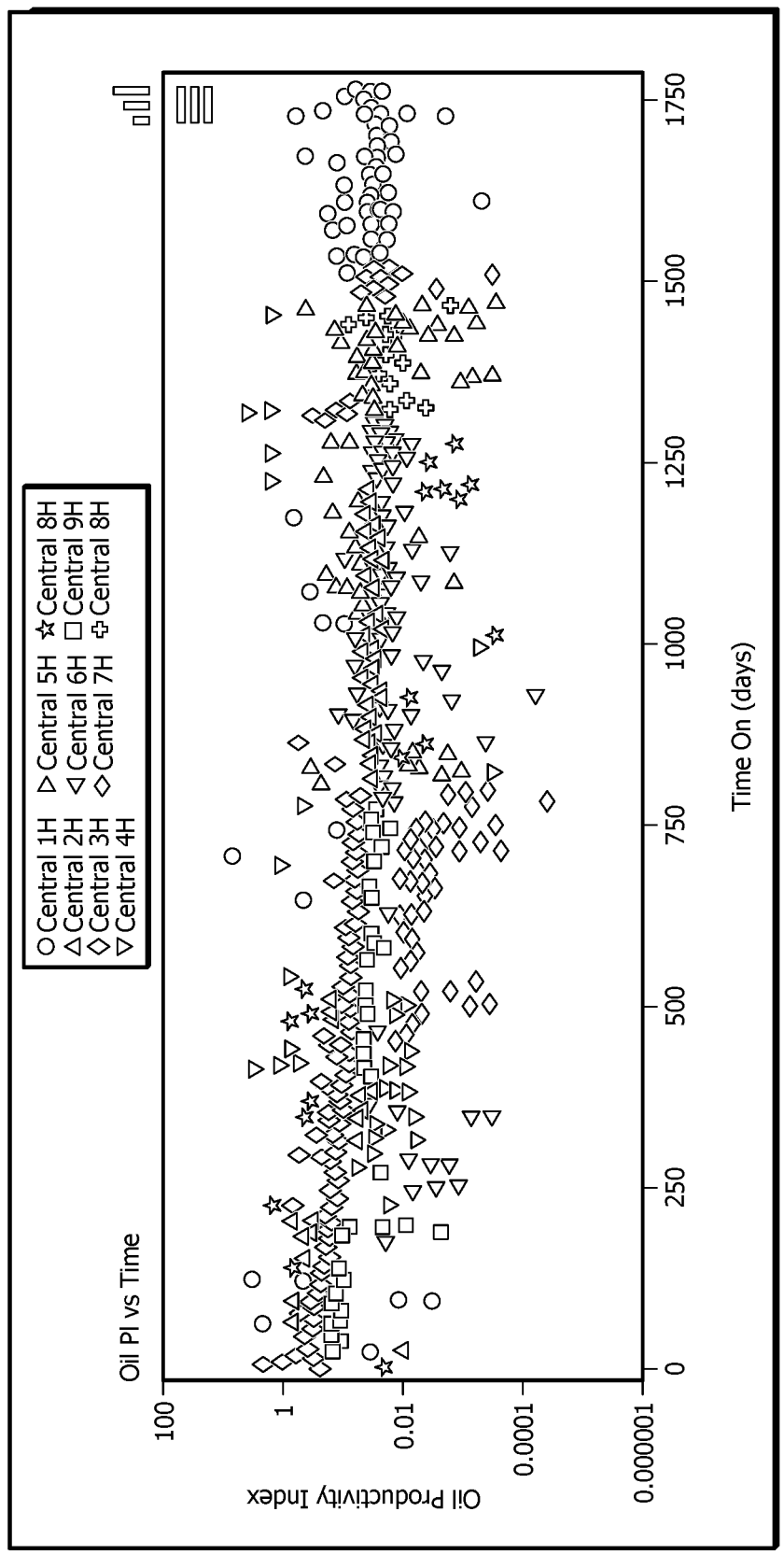
FIGS. 12A-12B are set of plots of depicting productivity index (PI) vs time and vs cumulative oil.
Figure 12B:
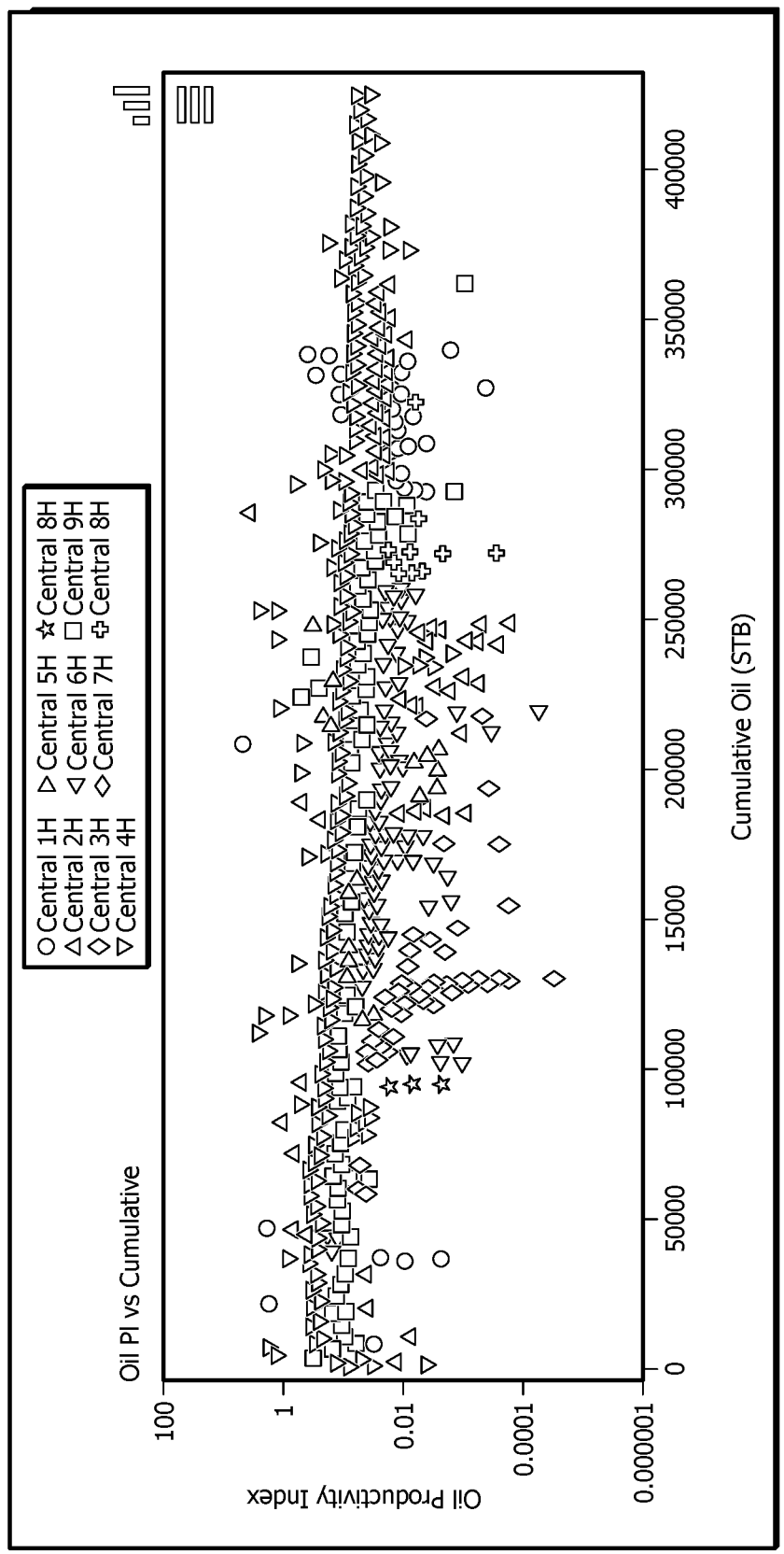

Finally, when the reservoir is fully saturated (average reservoir pressure has depleted below saturation pressure), the PI is represented as follows.

$$q_l = \left(\frac{PI * p_{avg}}{1.8}\right) * \left[1 - 0.2\frac{p_{wf}}{p_{avg}} - 0.8\left(\frac{p_{wf}}{p_{avg}}\right)^2\right] \quad (29)$$

where:
 $q_l$—liquid rate
 PI—liquid productivity index
 $p_{avg}$—average reservoir pressure
 $p_{wf}$—flowing bottomhole pressure
 $p_{sat}$—saturation pressure FIGS. 12A-12B illustrate typical PI trends for several wells from a major liquid-rich US shale play.

Production Forecasting

Figure 13A:
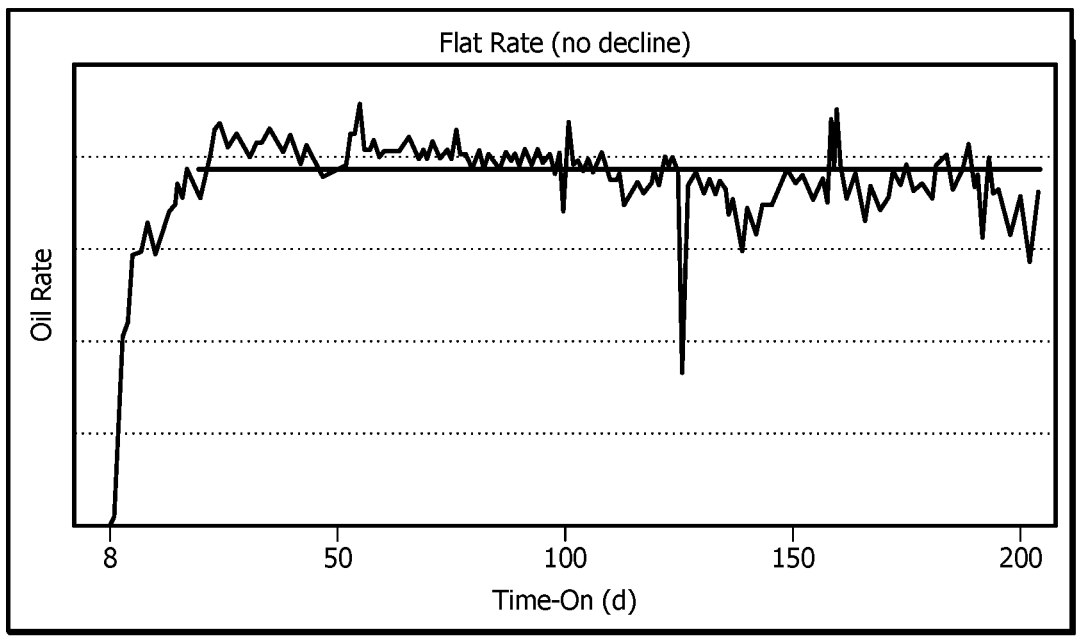
FIGS. 13A-13B is set of plots showing an example of a rate-constrained well with flat production after 6 months of operation.
Figure 13B:
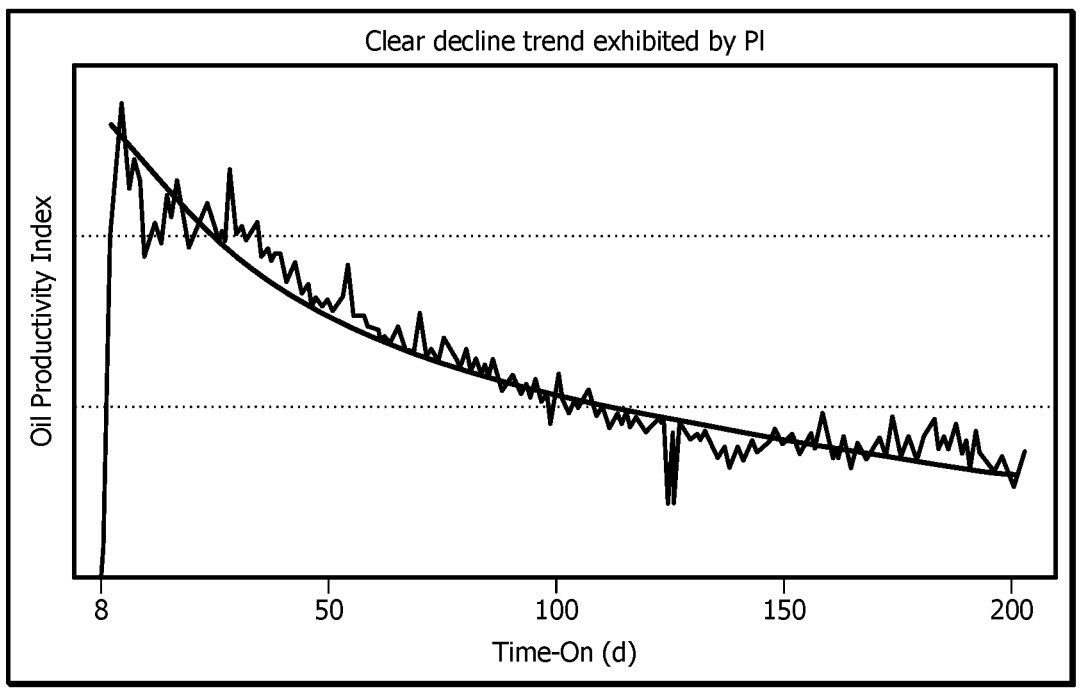

In example embodiments, decline curve analysis (DCA) may be used for a production forecasting method in unconventional reservoirs. As there are surface or operational disruptions (e.g., downtime, production constraints, line pressure changes, choke changes, workovers etc.), the rate decline may be distorted in certain circumstances. In some scenarios, DCA models may not be applied as the well may not exhibit any discernable production decline, as illustrated by a sample well in FIG. 13 exhibiting flat production as it experiences facility constraints.

In certain embodiments the productivity index (PI) may be the forecasting variable, as it may allow for normalizing both surface effects and considers phase behavior, thus reducing noise. It may produce cleaner trends that are easier to fit, resulting in more accurate models and generates better predictions. Also, it may be possible to generate the forecast with less data, as a clean production decline trend can be established sooner (as highlighted in FIG. 13A-13B, where a clear production decline trend can be identified at early time even when the rates are flat). This PI decline behavior may be empirically validated on several tight permeability wells across multiple fields with constrained rate production. In comparison, pressure normalized rate-based decline methods, though similar, do not handle PVT effects or pressure depletion.

Figure 14:
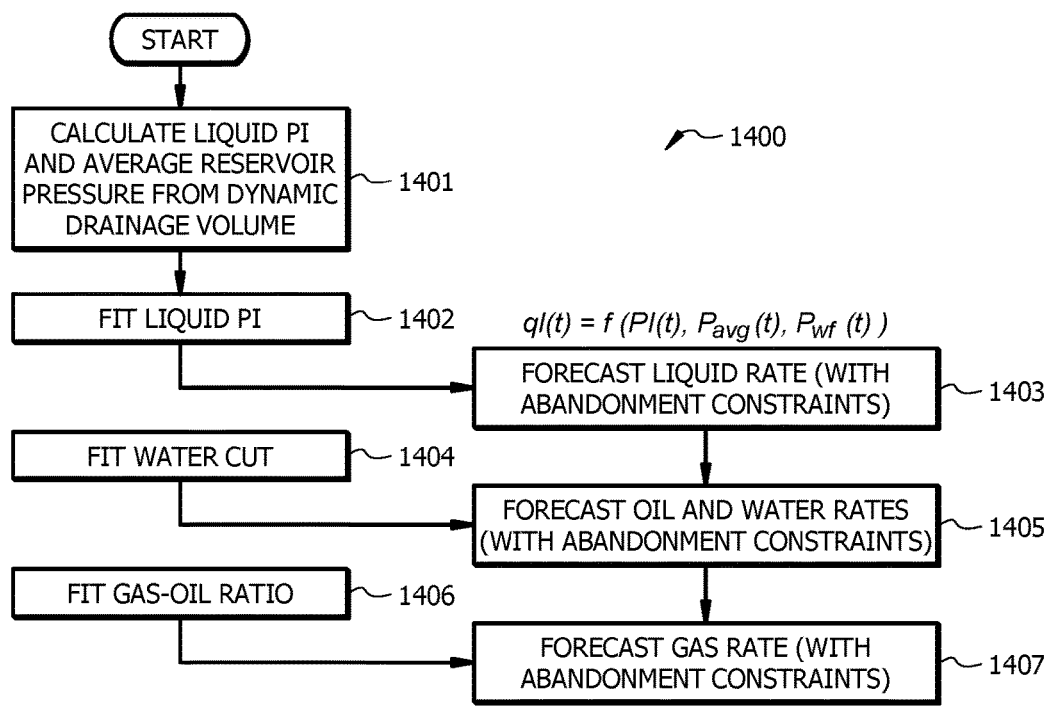
FIG. 14 is an illustration of a complete PI-based forecasting workflow.

In certain example embodiments, the PI-based forecasting method may include saturated flow conditions when the flowing BHP and reservoir pressure drop below bubble point. The complete forecasting workflow may be summarized in method 1400 in FIG. 14. At step 1401, the processor 200 (referring to FIG. 4) of control system 130 (referring to FIG. 4) may calculate liquid PI and average reservoir pressure from dynamic drainage volume. At step 1402, the liquid PI trend may be fitted with a modified hyperbolic equation using processor 200. The PI decline model may allow extrapolating the PI at future time steps. An assumption may be that the well will remain on primary depletion without sudden changes in productivity index, due to events such as a refrac or offset frac hit. Other time series-based forecasting models (ARIMA, RNN, etc.) may also be applied based on past values of PI and cumulative volumes.

$$PI_t = \frac{PI_0}{(1+b(N_p + W_p))^{\frac{1}{a}}} = f(t, N_p + W_p, PI_{t-k}) \quad (30)$$

Figure 15:
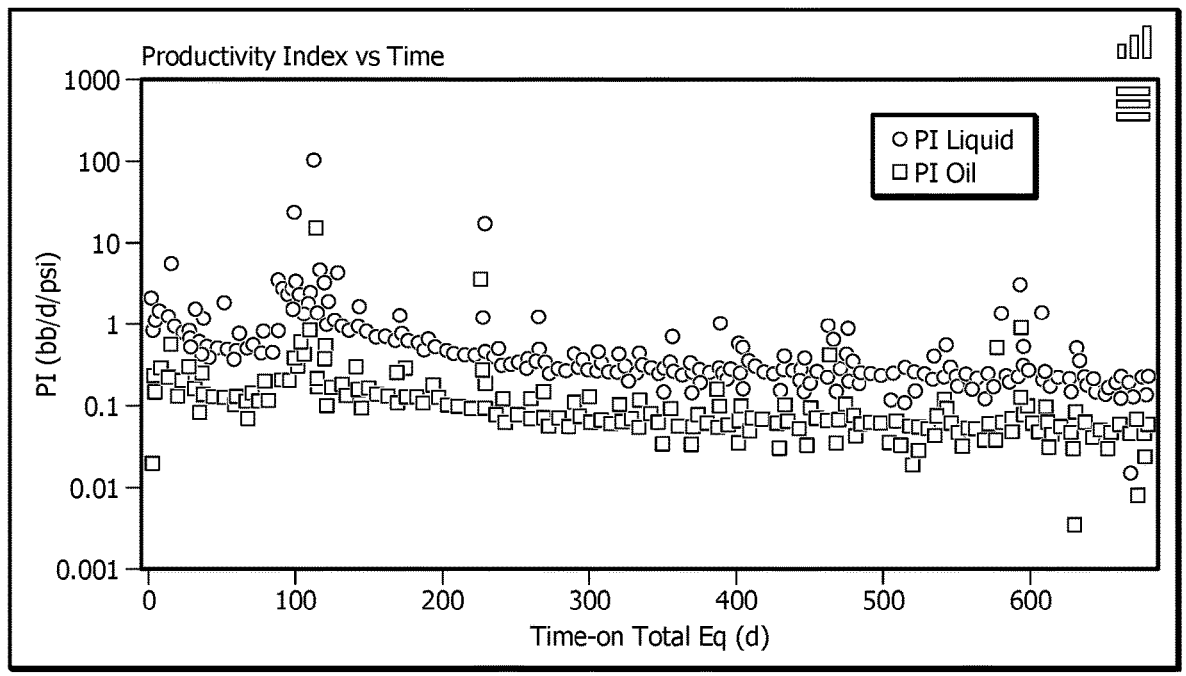
FIG. 15 is a plot showing a breakpoint in the PI trend after 100 days.
Figure 16A:
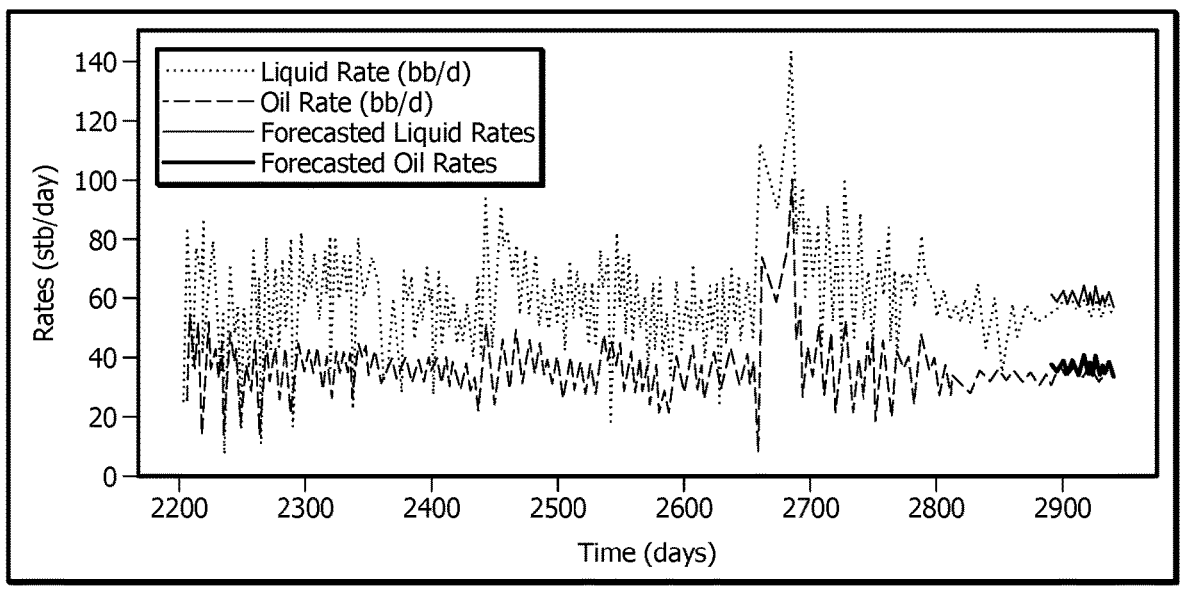
FIGS. 16A-16C are a set of forecast sensitivity plots for Well A.
Figure 16B:
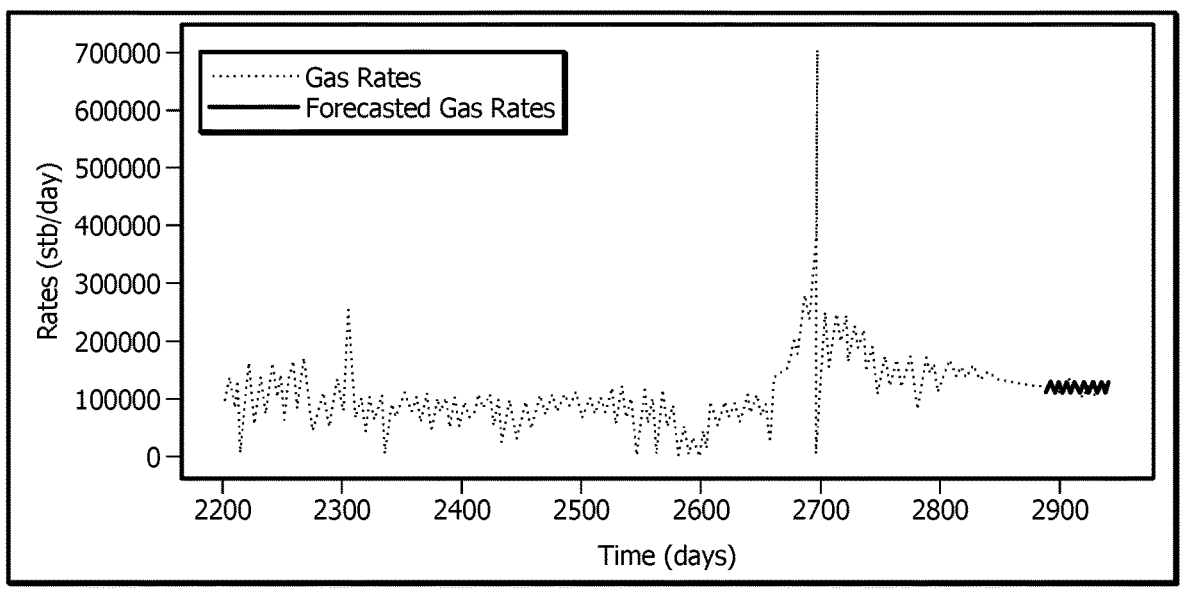
Figure 16C:
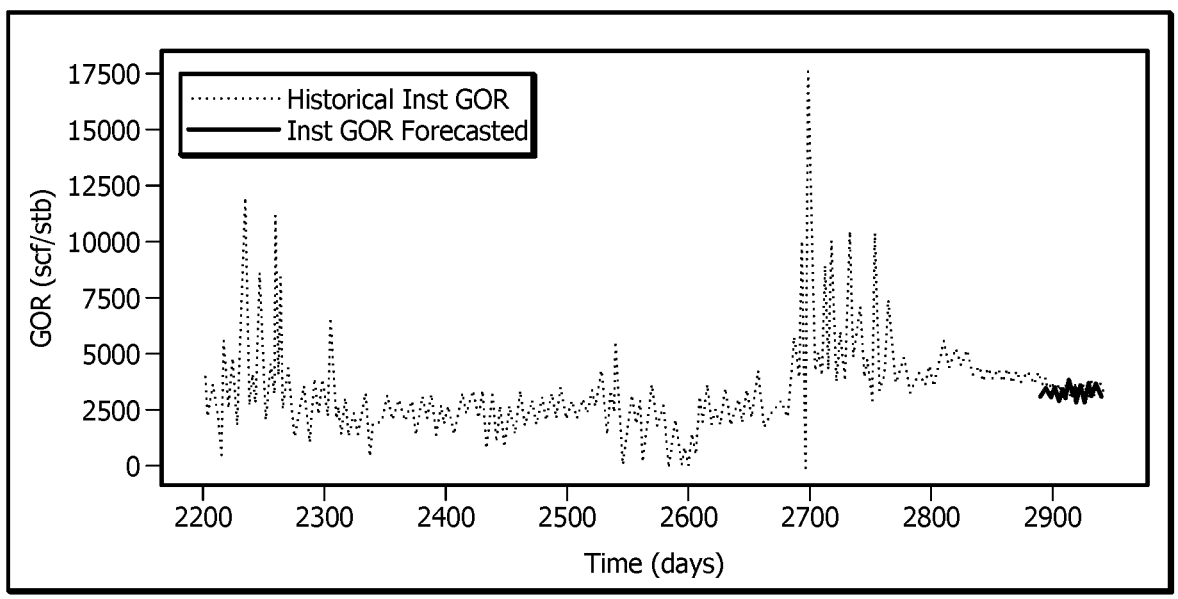
Figure 17A:
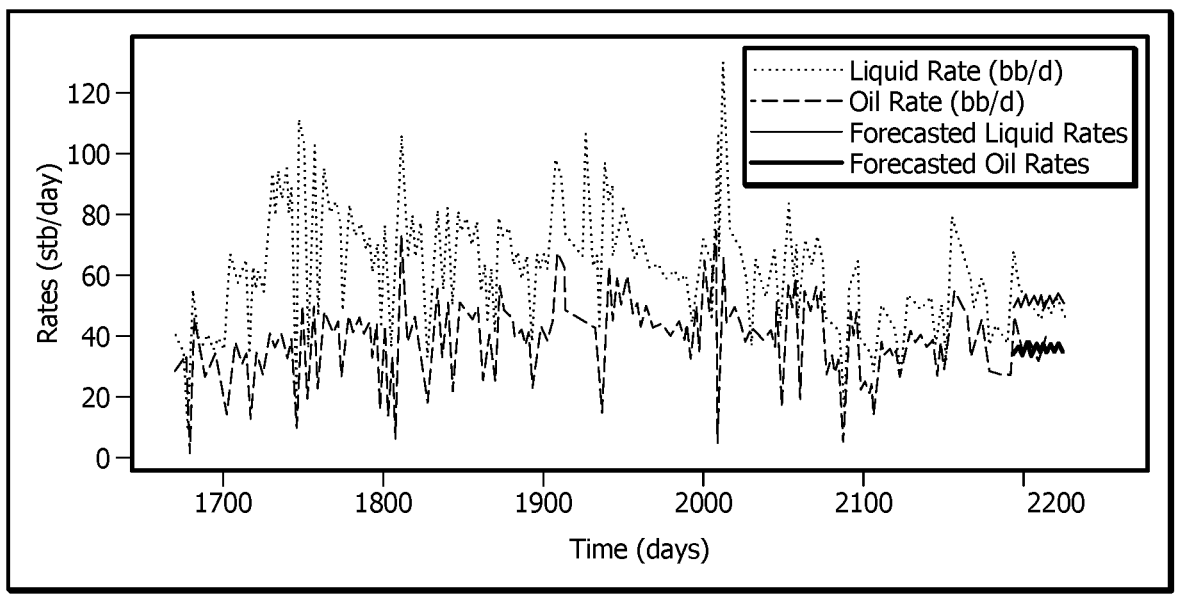
FIGS. 17A-17C are a set of forecast sensitivity plots for Well B.
Figure 17B:
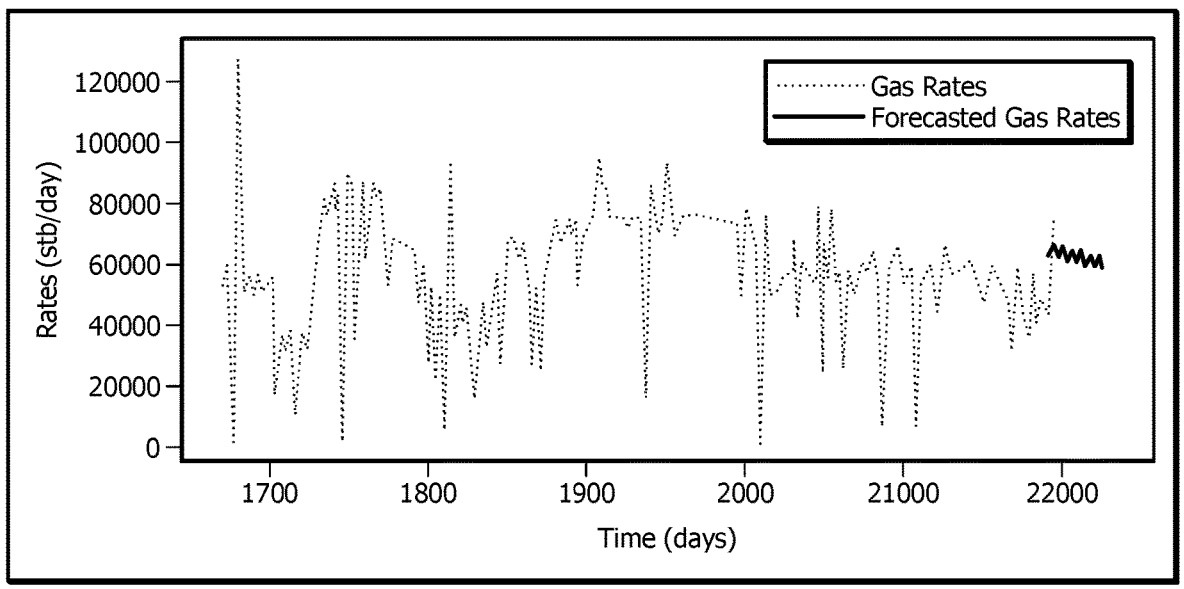
Figure 17C:
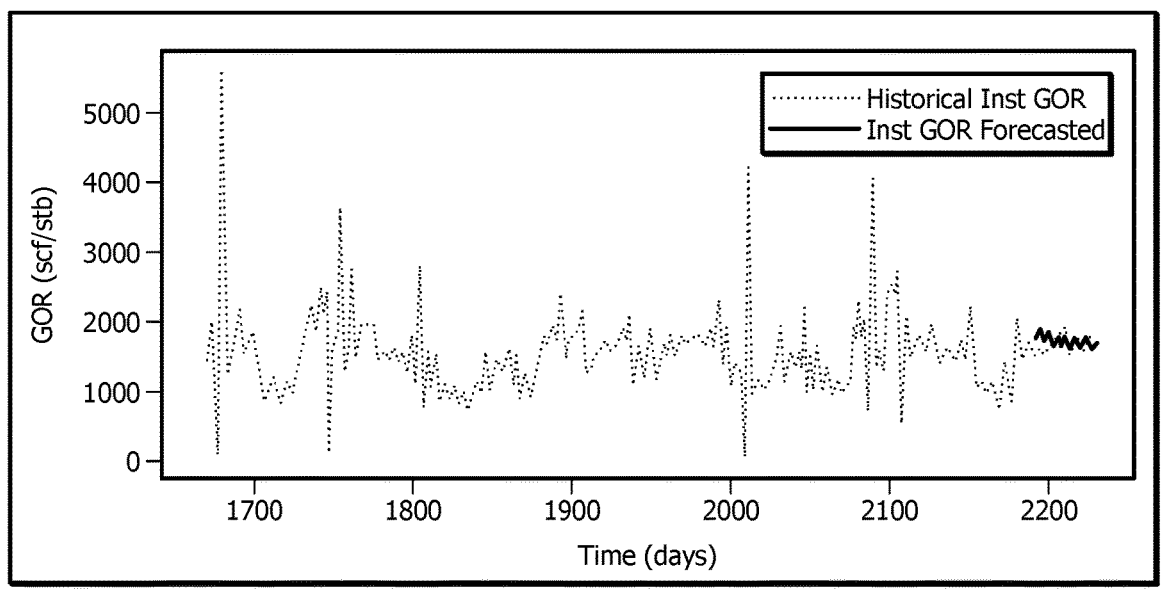

On the other hand, well interference may also be automatically identified using PI trends more clearly than using rate or pressure data. FIG. 15 highlights a breakpoint in the PI trend after 100 days, when a nearby child well was completed and subsequent change in well performance. In such cases, multiple PI segments can be fitted after each valid interference event to create a composite PI decline model. When parent-child interference needs to be included, PI forecast will depend on cumulative volumes of both parent and child wells.

Liquid Rate Forecast

With reference back to FIG. 14, at step 1403, the processor 200 may convert PI forecast into a liquid rate profile by combining it with reservoir pressure and BHP forecasts, using equations (27), (28) and (29). The average reservoir pressure may be extrapolated as a function of cumulative liquid, following the profile defined through material balance in the prior step 1402. The BHP profile may be completely controllable by an operator, as it represents the expected operating conditions under the planned production strategy for each well (e.g., choke schedule and artificial lift installs and operational set points). Hence, the BHP profile may be either a smooth profile or a segmented function representing multiple drawdowns corresponding to the application of various production methods. The BHP profile may become a sensitivity tool to evaluate the production impact of different operational strategies.

Once the liquid rate forecast is generated, as a single-phase forecast, a multiphase forecast may also be derived, obtaining the corresponding oil, gas and water rate profiles. This may be achieved in two steps (such as in steps 1405 and 1407), first modeling the water cut, and subsequently modeling the GOR. The water cut may be modeled in step 1404, and the GOR may be modeled in step 1406. Both the water cut and GOR models may be independent and modular, and various mathematical representations can be used as part of the workflow, tailored to a given field specific conditions. A person skilled in the art, with the benefit of this disclosure, will understand the appropriate models for water cut and GOR that could be used for given conditions. In certain embodiments, water cut may be modeled as a constant trend, a linear trend with a gentle slope, or more complex functional forms. In certain embodiments, a two-segment power law may be used to model GOR, derived by plotting cumulative oil and cumulative gas in a log-log plot and matching two straight-line models.

Water Rate Forecast

While more complex functional forms could be derived, water cut may be represented either as a constant trend, or a linear trend with a gentle slope. Unless a disruptive event happens, such as a frac hit from a neighbor well, typical water cut trends in unconventional wells under primary depletion may be smooth and gradual. A person skilled in the art, with the benefit of this disclosure, will understand the appropriate models for water cut that could be used for given conditions.

Gas Rate Forecast

As oil and water rates are forecast, the cumulative GOR from equation (24) may be determined. Once cumulative GOR forecast is obtained, instantaneous GOR and gas rates may be obtained easily by simple manipulation from cumulative oil volume forecast. A person skilled in the art, with the benefit of this disclosure, will understand the appropriate models for GOR that could be used for given conditions.

The following figures depict real field examples from the forecasting results. For these examples, classic decline curve models would likely not work on these wells since the production rates don't experience classic decline.

In these examples, FIGS. 16a-16c and FIGS. 17a-17c, for wells A and B respectively, the phase rates are forecasted 2 months in the future and a hold-out period of 2 months is used to validate against the forecasted rates. The production data shown for these wells is roughly the latest 2 years as can be seen in the plots. As shown, the forecasted data are accurate to within 5% error of the actual data on oil, gas and instantaneous GOR.

Figure 18A:
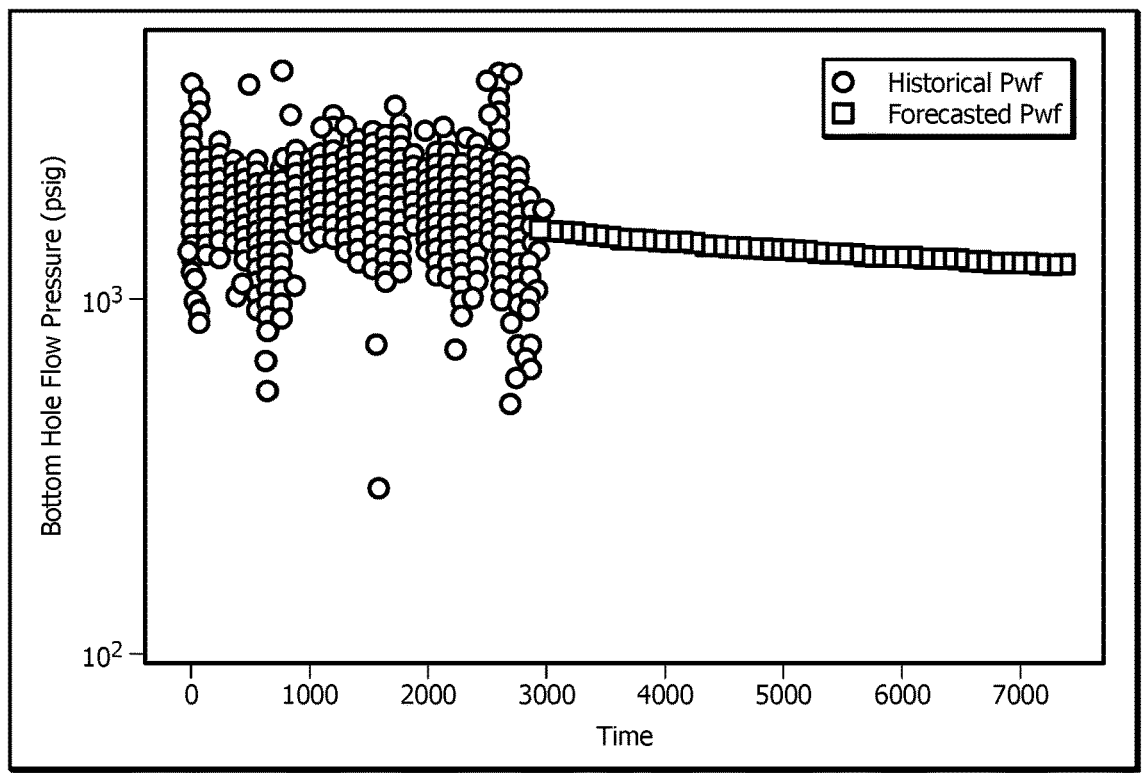
FIGS. 18A-18B are a set of forecast plots using the BHP forecast profile and the GOR forecast profile.
Figure 18B:
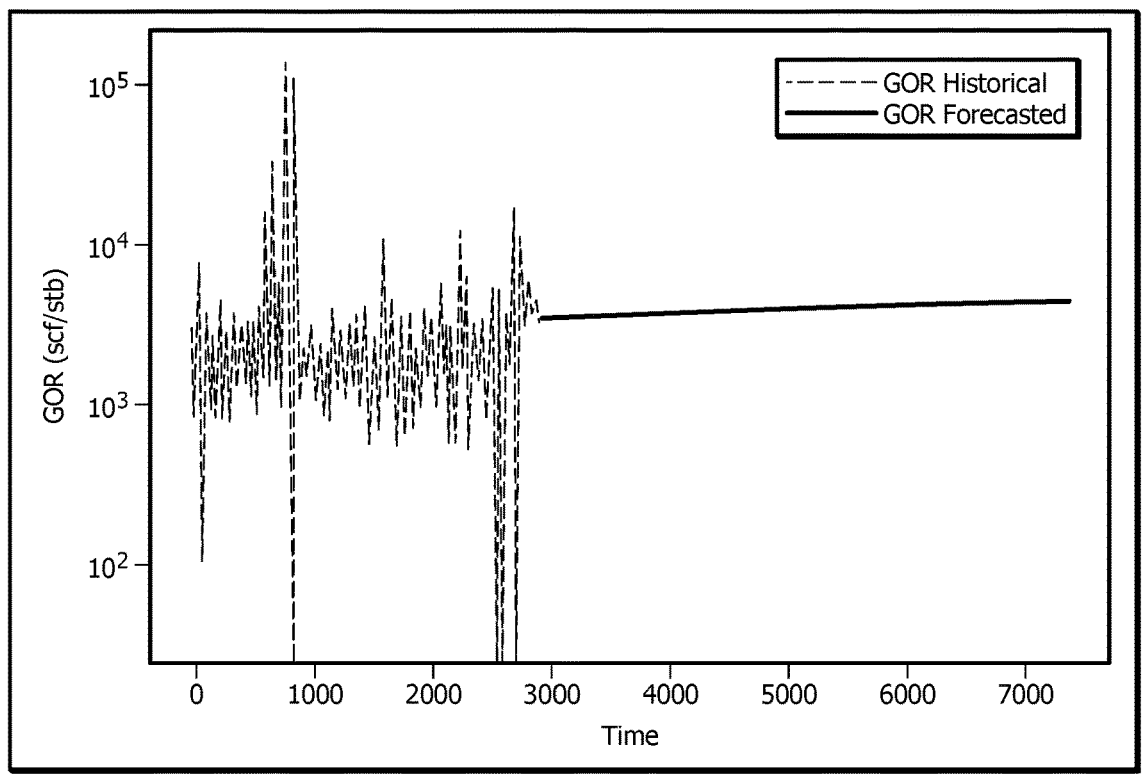

Actual phase rates were validated with the forecasted rates in both examples. In example embodiments, the forecast can be extended to a longer time period for the purpose of analyzing long term well performance and estimated ultimate recovery (EUR) estimates. The forecasts may be based on the given operational conditions enabled through PI based forecasting, which takes into account effects of bottom hole pressure that is reflected in forecasting oil and water and thus in the material balance equation (24). FIGS. 18a-18b depict the same well A with the BHP profile forecast chosen and the corresponding GOR forecast profile, which is evaluated within a few seconds using the methodology of the present disclosure.

Inflow Performance Relationship

Inflow Performance Relationship (IPR) curves may be a useful representation of well deliverability at a given reservoir condition, as they display expected liquid production at various pressure drawdowns. Combined with a Vertical Lift Performance (VLP) curve, representing the well intake, nodal analysis may be performed to determine the well operating point. This system analysis may provide the basis for production optimization, informing artificial lift timing and operational decisions.

IPR curves may not have traditionally been used in unconventionals exhibiting prolonged transient flow, since they may, in certain circumstances, be primarily used in boundary-dominated systems in pseudo-steady state. Example approaches may define IPR curves dynamically using the calculated average reservoir pressure and liquid productivity index. Following the same approach, using equations (27), (28) and (29), the IPR envelope may be defined at any time step (either historical or forecasted), and may form the basis of production optimization analysis.

In certain embodiments, it is important to use a correct definition of PI to obtain an accurate IPR curve that accurately represents the well deliverability. In the absence of practical methods to estimate depletion and PI, PI may be assumed as a simple ratio between rate and the pressure difference between initial reservoir pressure and current BHP, as defined in Equation (31) below as pressure-normalized rate (PNR). This is not a true Productivity Index (as defined in (27), (28) and (29)) as it fails to incorporate pressure depletion and incorrectly assumes that the rate always exhibits a linear relationship with drawdown.

$$PNR = \frac{q}{p_i - p_{wf}} \quad (31)$$

Figure 19:
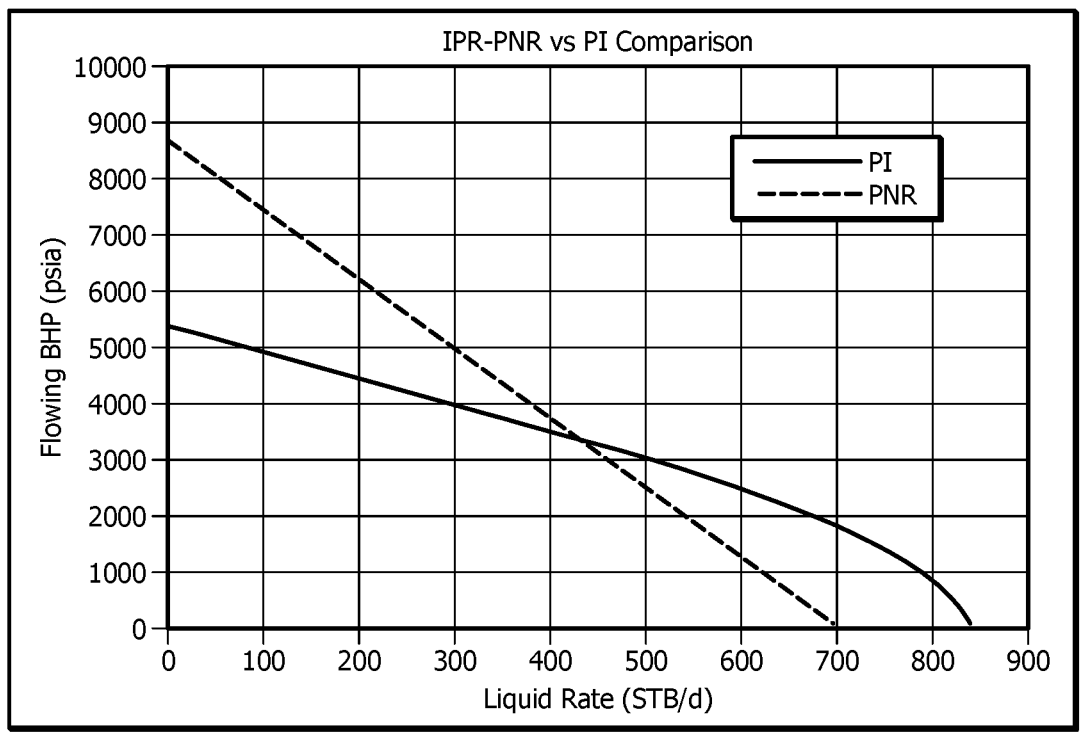
FIG. 19 is a plot of inflow performance relationship (IPR) curves comparing using productivity index (PI) as a variable and using pressure-normalized rate (PNR).
Figure 20A:
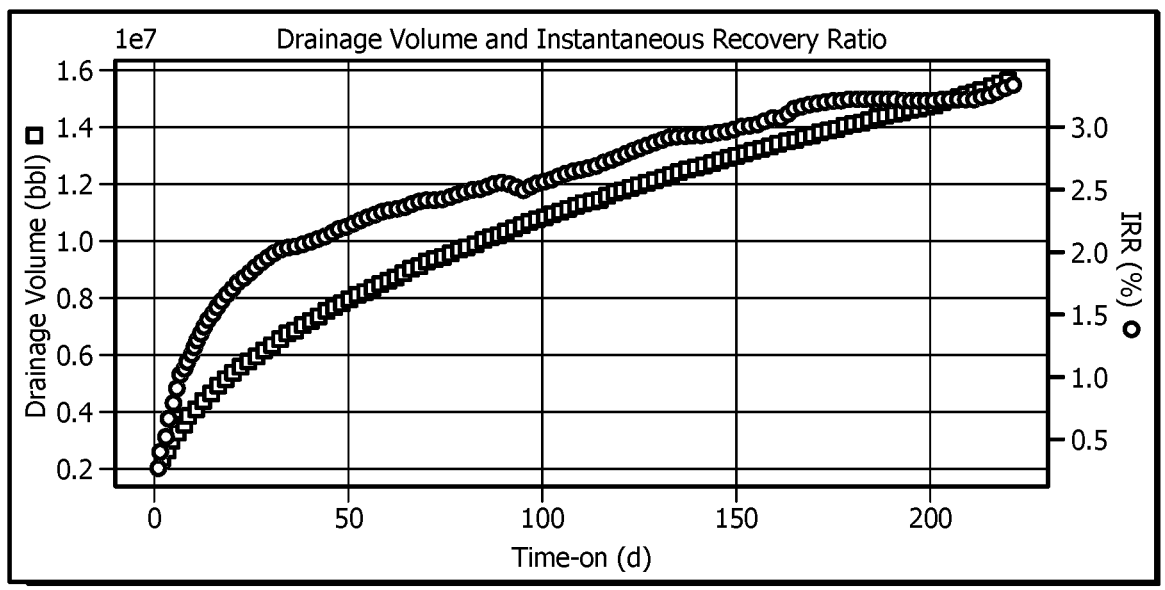
FIGS. 20A-20D are a series of plots showing drainage volume and instantaneous recovery ratio, pressures, productivity index, and dynamic IPR for a sample well.
Figure 20B:
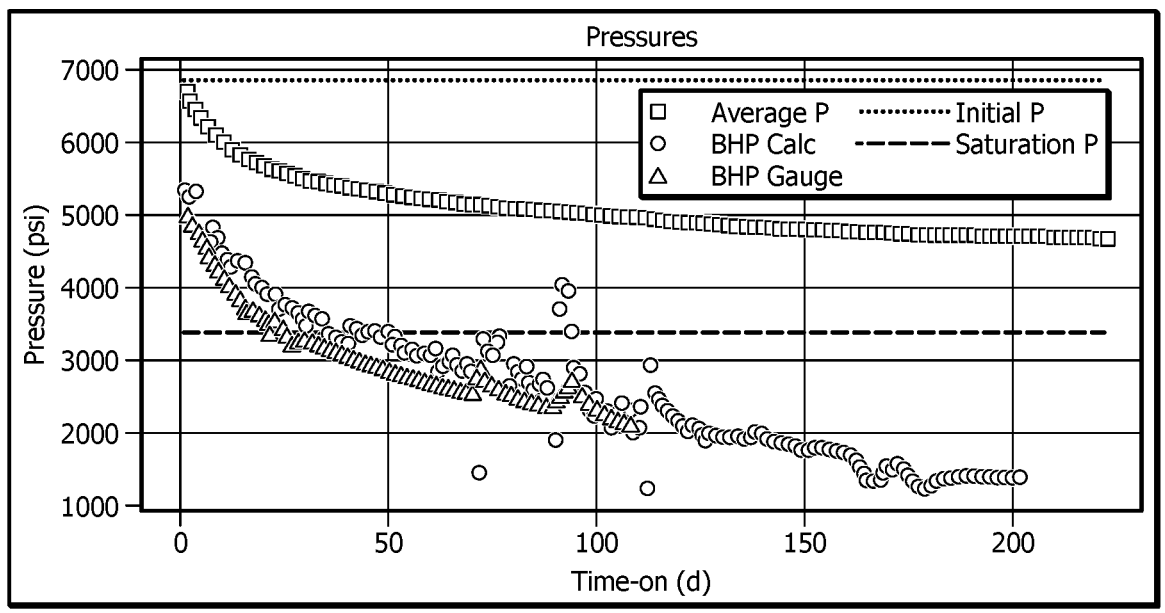
Figure 20C:
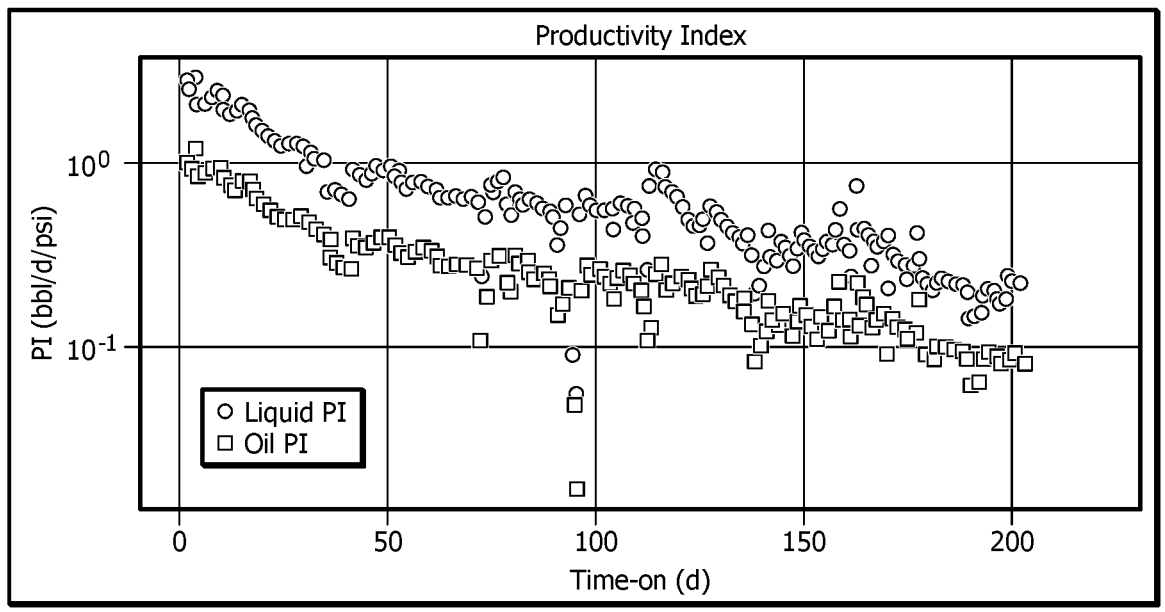
Figure 20D:
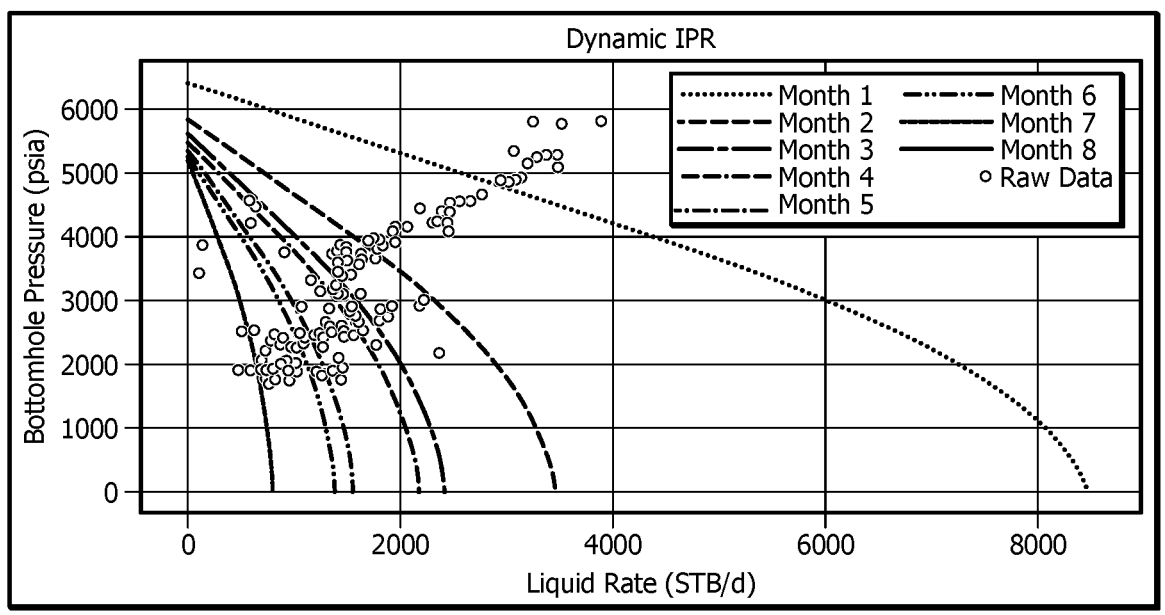
Figure 21A:
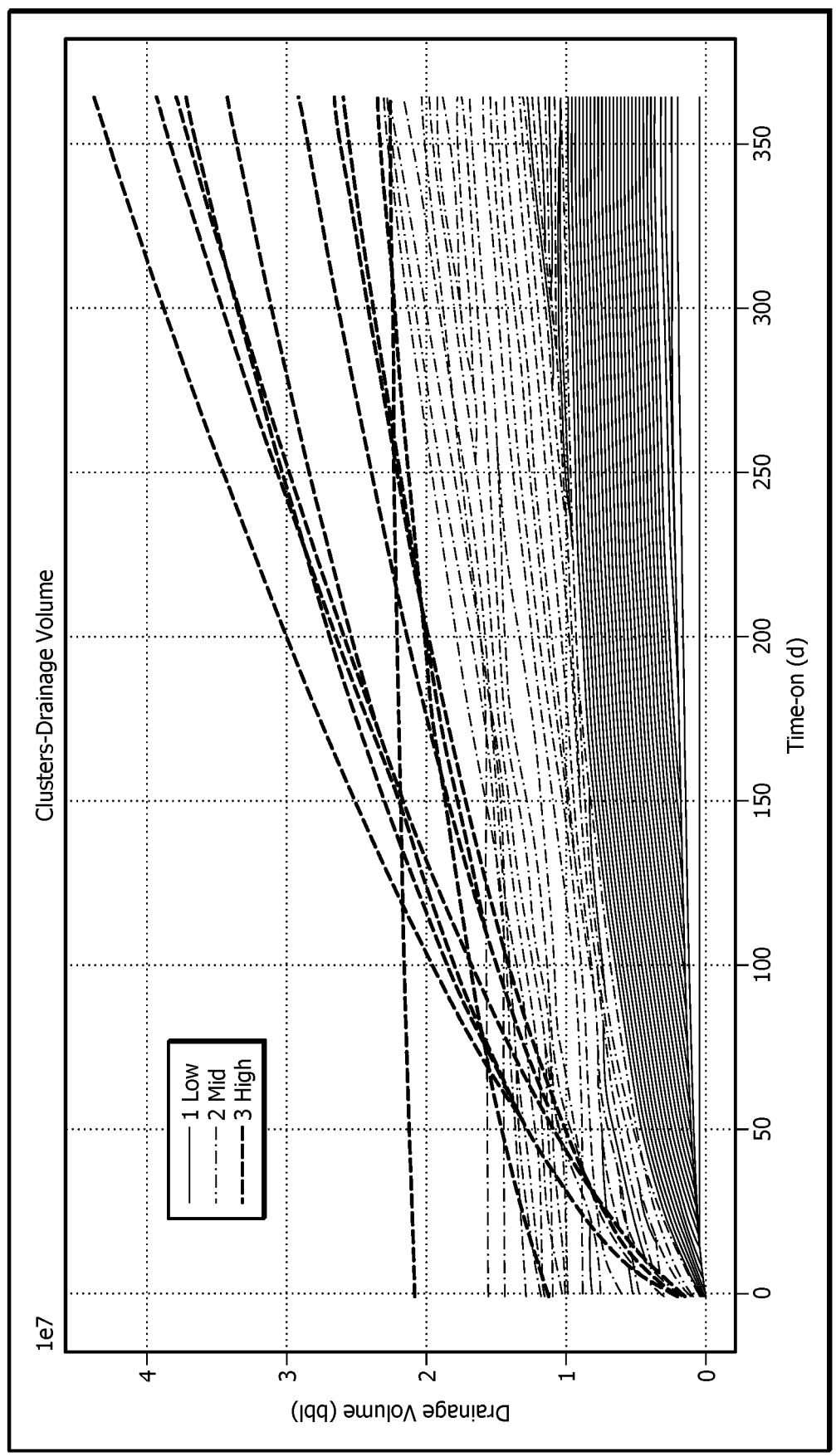
FIGS. 21A-21B is a set of plots showing drainage volume clusters for a sample dataset with wells in an unconventional field.
Figure 21B:
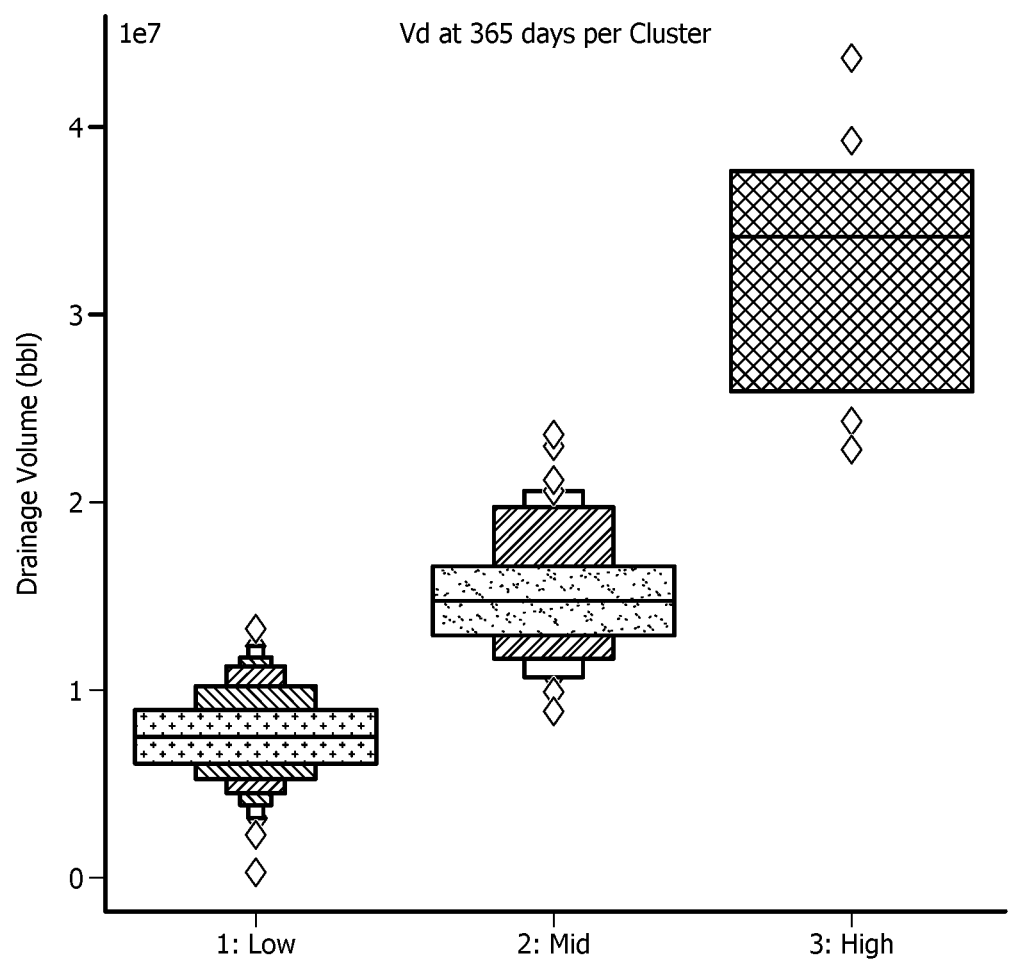

Using PNR to represent productivity may, in some instances, lead to inaccurate representations of the well deliverability, as shown in FIG. 19, representing a sample well exhibiting significant pressure depletion and producing at a BHP just above saturation pressure. Even if the operating point (e.g., current rate and BHP) may be captured by both methods, a linear PNR may misrepresent the rate potential at different drawdown conditions and may, in certain circumstances, lead to inaccurate conclusions when the IPR is used as a production optimization tool to inform operational decisions.

Modeling Gas Cases

The transient well performance analysis may also be applied for gas cases, with some modifications. As a starting point, either for dry-gas or gas-condensate cases, appropriate PVT correlations may be used, especially in case of gas condensate where the specific gravity is estimated from both gas and liquid specific gravities, considering the separator conditions.

In order to apply the DTOF method from equation (3), the rate-normalized pressure may be expressed in terms of pseudo-pressures.

$$RNP = \frac{mp_i - mp_{wf}}{q} \quad (32)$$

The pseudo-pressure is an analytical formulation dependent on the gas PVT properties, used to linearize the diffusivity equation by incorporating the pressure dependence of gas z-factor and viscosity, through the following integral evaluated to the pressure of interest.

$$mp = 2 \int_{p_{ref}}^{p} \frac{p}{\mu z} dp \quad (33)$$

where:
mp—pseudo-pressure at pressure of interest
p—pressure
$\mu$—gas viscosity
z—gas compressibility factor (z-factor)

A second modification may involve modifying the Perrine-Martin method. Instead of calculating a total equivalent liquid rate, for gas systems, gas may be assumed as the reference phase dominating fluid flow. The calculation may be done in the following two steps. First, total equivalent gas rate is determined through equation (34), by incorporating the oil condensate as a gas pseudo-component in the gas rate. Second, total equivalent downhole rate is calculated through equation (35), which combines gas and water flow.

$$q_{ge} = q_g\left(1 + 132800 \frac{\gamma_{o\_sg}}{M_o GOR}\right) \quad (34)$$

$$q_{te} = q_{ge}B_g + q_w B_w \quad (35)$$

where:
$q_{te}$—total equivalent downhole rate
$q_{ge}$—equivalent gas rate
$q_g$—gas rate
$\gamma_{o\_sg}$—oil specific gravity
$M_o$—oil molecular weight
GOR—production gas-oil ratio (instantaneous ratio of gas rate/oil condensate rate)
$q_w$—water rate
$B_g$—gas formation volume factor
$B_w$—water formation volume factor This final rate may be used in equation (32) to estimate rate-normalized pressure, equation (4) to define material balance time, and finally, evaluating equation (3) to determine the drainage volume.

Material Balance

The material balance expression may also be reformulated to account for gas as the reference volume in the reservoir. The generalized material balance expression for gas is defined as in equation (36).

(Gas expansion)+(Water expansion)+(Change in pore volume due to connate water/residual gas expansion and pore volume reduction)=(Underground withdrawal) (36)

The gas expansion term is defined as:

$$G(B_g - B_{gi}) \quad (37)$$

where:
G—total gas volume originally in place
$B_g$—gas formation volume factor at pressure of interest
$B_{gi}$—gas formation volume factor at initial reservoir pressure The water expansion term is defined as:

$$W(B_w - B_{wi}) \quad (38)$$

where:
W—total water volume originally in place
$B_w$—water formation volume factor at pressure of interest
$B_{wi}$—water formation volume factor at initial reservoir pressure The ratio $\omega$ is defined as the ratio between the original in-situ water and gas volumes, as defined in equation (39), and can be approximated as shown in equation (40).

$$\omega = \frac{WB_{wi}}{GB_{gi}} \quad (39)$$

$$\omega \approx \frac{(S_w - S_{wc})B_{wi}}{(1 - S_w - S_{gr})B_{gi}} \quad (40)$$

The change in pore volume due to the expansion of connate water and residual gas, and pore volume reduction, is derived as follows:

$$dPV = -dV_w - dV_g + dV_F = -(c_w V_w + c_g V_g + c_F V_F)\Delta p \quad (41)$$

where oil, water and pore volumes are defined as $$V_g = \frac{(GB_{gi} + WB_{wi})S_{wc}}{1 - S_{wc} - S_{gr}} \quad (42)$$

$$V_w = \frac{(GB_{gi} + WB_{wi})S_{gr}}{1 - S_{wc} - S_{gr}} \quad (43)$$

$$V_F = \frac{GB_{gi} + WB_{wi}}{1 - S_{wc} - S_{gr}} \quad (44)$$

By combining equations (43), (44), and (44) into equation (41), equation (45) is obtained:

$$-dPV = (GB_{gi} + WB_{wi})\left(\frac{S_{wc}c_w + S_{gr}c_g + c_F}{1 - S_{wc} - S_{gr}}\right)\Delta p \tag{45}$$

where:
dPV—total change in pore volume
$dV_w$—expansion in connate water volume
$dV_g$—expansion in residual gas volume
$dV_F$—reduction in pore volume due to formation compressibility
$S_{wc}$—connate water saturation
$S_{gr}$—residual gas saturation
The underground withdrawal is calculated as follows.

$$G_p B_g + W_p B_w \tag{46}$$

where:
$G_p$—cumulative gas production
$W_p$—cumulative water production
$B_g$—gas formation volume factor at pressure of interest
$B_w$—water formation volume factor at pressure of interest All terms may be combined in the generalized material balance expression and calculated either in terms of the reservoir pressure change, per equation (47), or drainage volume, per equation (48).

$$\Delta p = \left(\frac{1 - S_{wc} - S_{gr}}{S_{wc}c_w + S_{gr}c_g + c_F}\right)\left\{\frac{G_p B_g + W_p B_w}{V_d} - \left(\frac{1}{1+\omega}\right)\left[\frac{(B_g - B_{gi})}{B_{gi}} + \frac{\omega(B_w - B_{wi})}{B_{wi}}\right]\right\} \tag{47}$$

$$V_d = \frac{G_p B_g + W_p B_w}{\frac{1}{(1+\omega)}\frac{(B_g - B_{gi})}{B_{gi}} + \left(\frac{\omega}{1+\omega}\right)\frac{(B_w - B_{wi})}{B_{wi}} + \left(\frac{S_{wc}c_w + S_{gr}c_g + c_F}{1 - S_{wc} - S_{gr}}\right)\Delta p} \tag{48}$$

Equations (47) and (48) are valid for dry gas cases. In the presence of liquid condensate, the cumulative gas term ($G_p$) may be modified to account for the condensate production, similar to the correction done in equation (34).

$$G_{pe} = G_p + 132800 \frac{\gamma_{o\_sg}}{M_o} N_p \tag{49}$$

where:
$G_{pe}$—gas equivalent cumulative production
$G_p$—cumulative gas production
$N_p$—cumulative oil (condensate) production
$\gamma_{o\_sg}$—oil (condensate) specific gravity
$M_o$—oil (condensate) molecular weight In equations (47) and (48), the gas formation volume factor may be substituted by a two-phase formation volume factor which explicitly includes the impact of retrograde condensate on the gas properties.

When the drainage volume and average reservoir pressure are known from a gas system, a productivity index may be estimated using a gas-specific deliverability relationship (such as the c & n method), which forms the basis of subsequent production forecasting and IPR definition.

The present disclosure may apply to wells with slightly compressible fluids (black oil) and variable compressibility fluids (volatile oil, gas condensate and dry gas), effectively handling production above and below saturation pressure.

By using routinely captured field data, without making geometrical assumptions about the well or requiring reservoir properties which may be difficult to capture for most wells, the model may be applied to a large number of wells, generating consistent performance metrics (such as PI, drainage volume and IRR) to characterize well performance at field scale. Multi-well trends in drainage volume, IRR and PI may be effectively used to quantify differences in completion effectiveness and reservoir quality. FIGS. 20a-20d show the results computed for a single sample well with validation of bottomhole pressure measured using a memory gauge.

With field-wide drainage volume and PI metrics, data-driven unsupervised clustering techniques may be used to find wells with similar characteristics. FIGS. 21A-21B and 22A-22F shows results from 3 drainage volume clusters for a sample dataset with about 600 wells in an unconventional field. Since drainage volume represents dynamic well response, such groupings may inform the key performance drivers describing well performance.

For example, in the case study shown in FIGS. 21A-21B and FIGS. 22A-22F, an increasing drainage volume may be correlated with a higher productivity index. However, this does not always translate into a higher produced volume, as seen in cluster 3, which also experiences a smaller amount of pressure depletion. Wells with larger drainage volume may be constrained (e.g., choke management, surface offtake capacity limits, line back pressure etc.) and may be potential candidates to increase production by systematically removing these constraints. Similarly, the drainage volume may be correlated with completion design (as evidenced with the strong correlation with proppant intensity). In this example, there is no significant correlation with rock and fluid properties, such as initial reservoir pressure and oil gravity.

Figure 23:
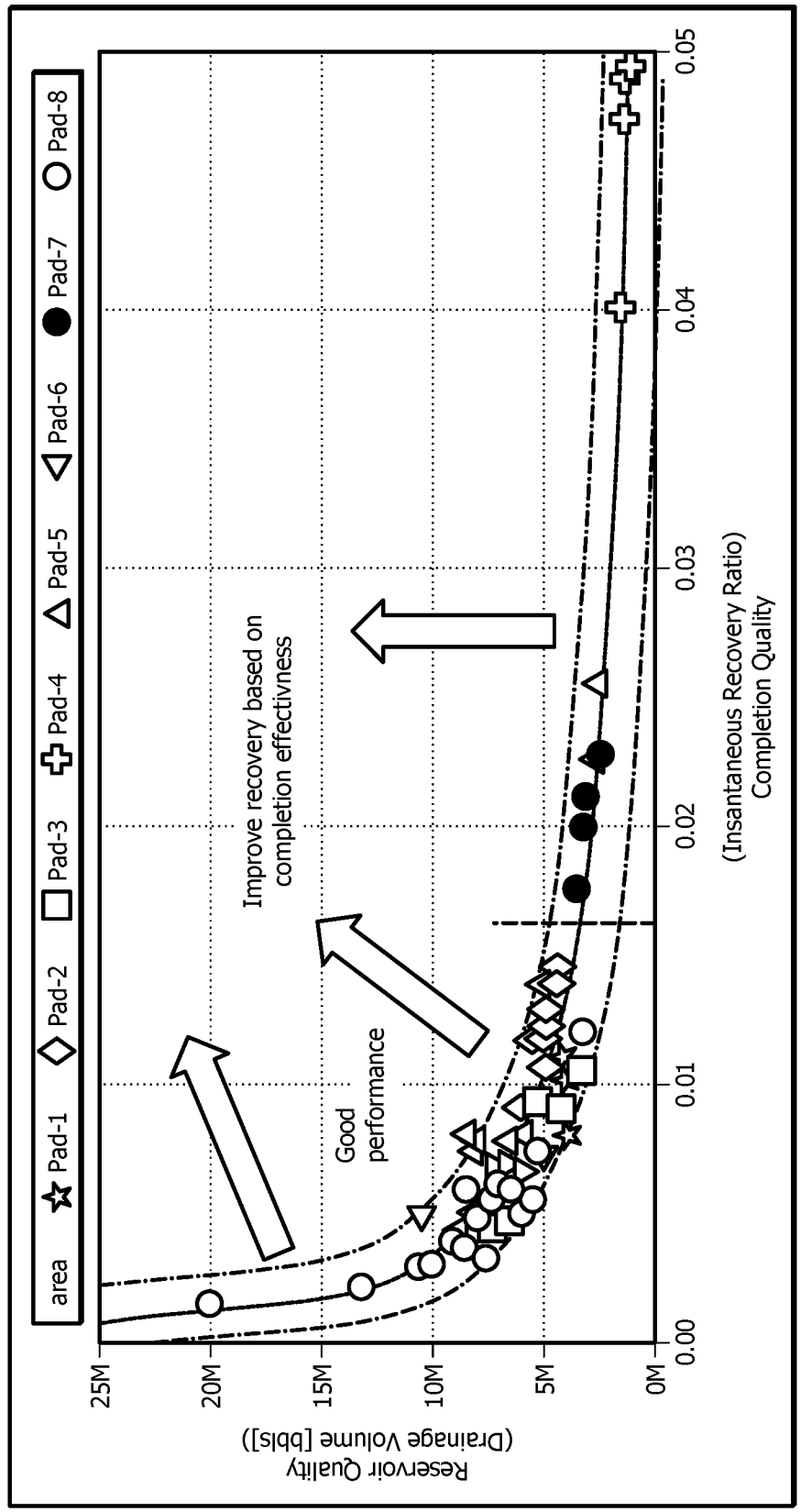
FIG. 23 is plot of well pads showing a relationship between reservoir quality and completion quality.

A multidimensional analysis may elucidate differences between reservoir quality and completion effectiveness, as shown in FIG. 23, from a case study in a different basin. The intent may be to distinguish differences between pads of wells completed in different geology and with various completions design. Drainage volume may be used as a proxy for reservoir quality, and IRR may represent the completion effectiveness. The desired outcome is a high contacted drainage volume with a high recovery efficiency; the curves in FIG. 23 represent an efficient frontier of improved performance. These types of plots may condense complex multidimensional trends into interpretable outputs, highlighting meaningful differences between wells and providing insights to inform the field development strategy for the undrilled inventory.

Improve Forecasting Accuracy Compared to Rate-Based Methods

By normalizing production for surface effects and changing operating conditions, and quantifying the depletion effect, PI-based forecasting may provide a more robust way to predict future production, with favorable model accuracy when compared with decline curve analysis models. The methods of the present disclosure may provide a better definition on the long-term gas forecasting and natively capture the PI degradation due to depletion and multiphase effects, resulting in an analytical production forecast which is "fluid-aware".

Figure 24A:
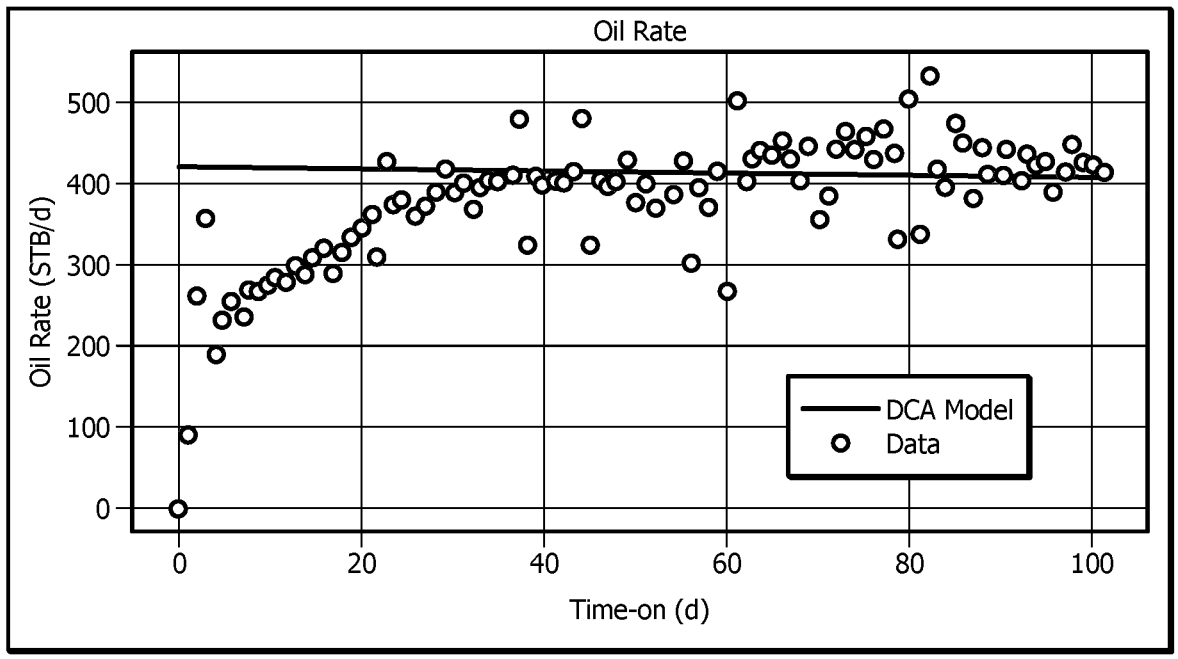
FIGS. 24A-24C are a series of plots showing the forecasting results comparison for a single well between decline curve analysis (DCA) and PI-based forecasting (PBIF) methods.
Figure 24B:
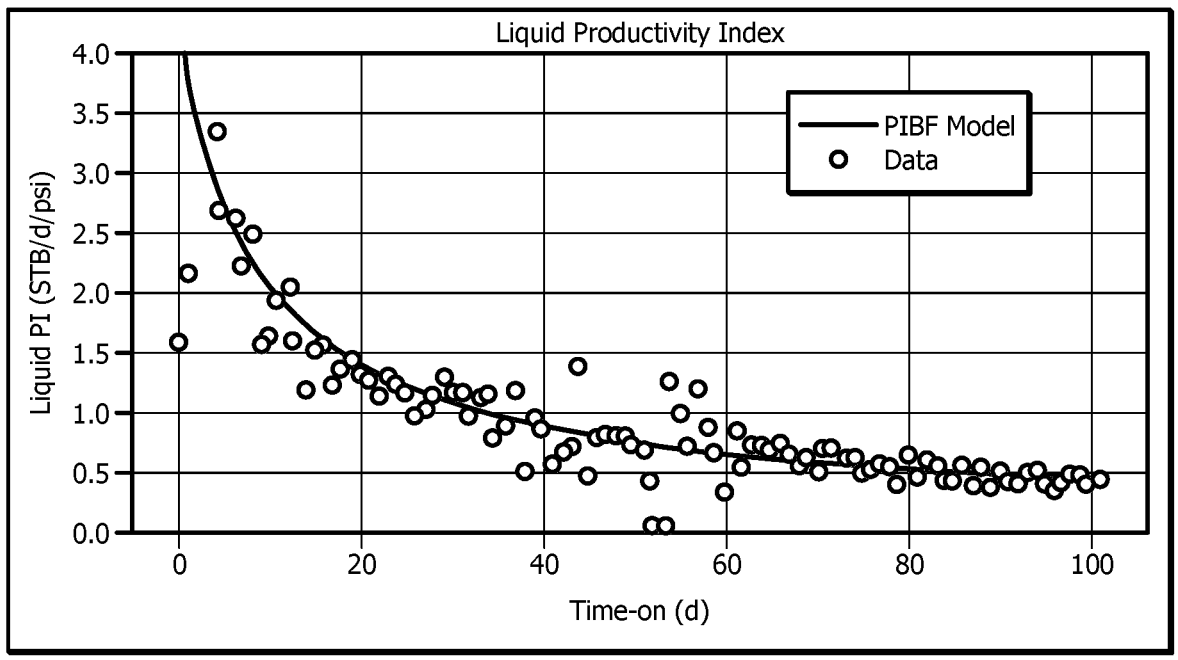
Figure 24C:
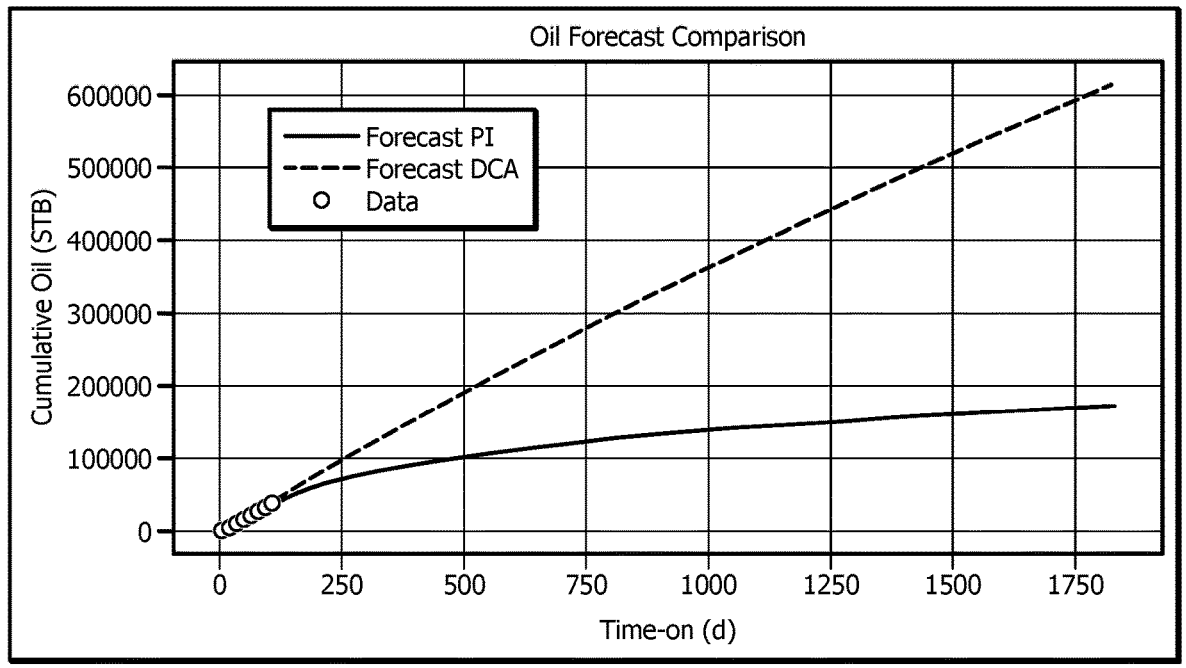

In order to validate the PI-based forecasting (PIBF) method against traditional decline curve analysis (DCA), a hindcasting exercise was carried out in a major unconventional field with more than 1000 wells, as seen in FIGS. 24A-24C. FIGS. 24A-24C show the forecasting results comparison for a single well between DCA and PIBF methods, where the PIBF method is able to better forecast production under severe constraints, as the well does not experience a clear rate decline trend.

Figure 25:
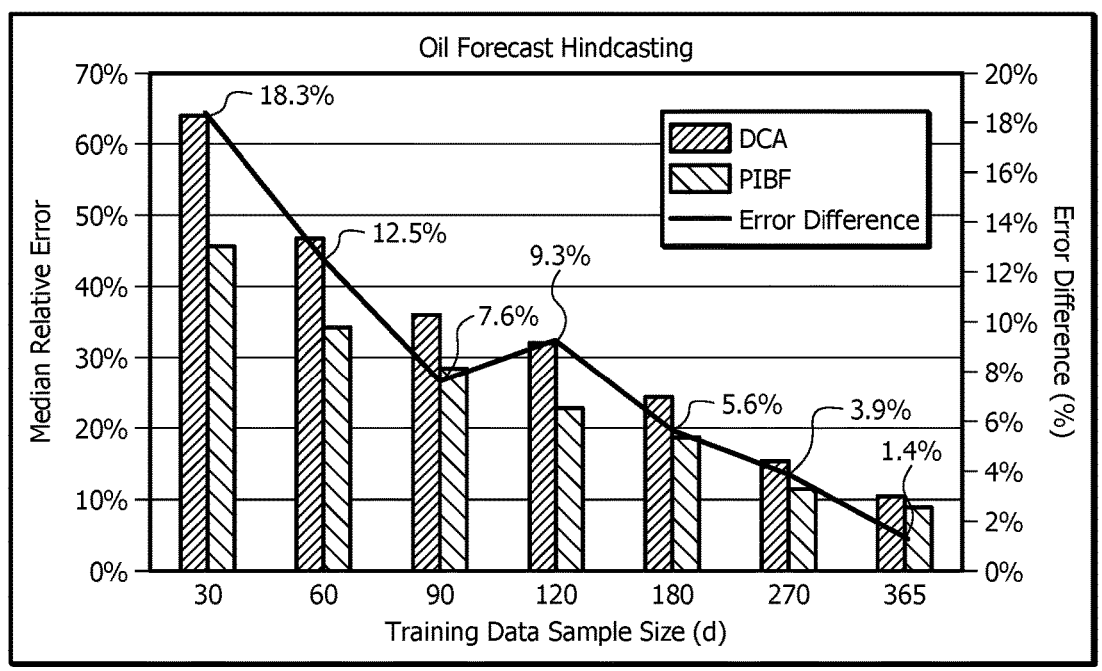
FIG. 25 is a plot showing field-wide results for oil forecasting.
Figure 26A:
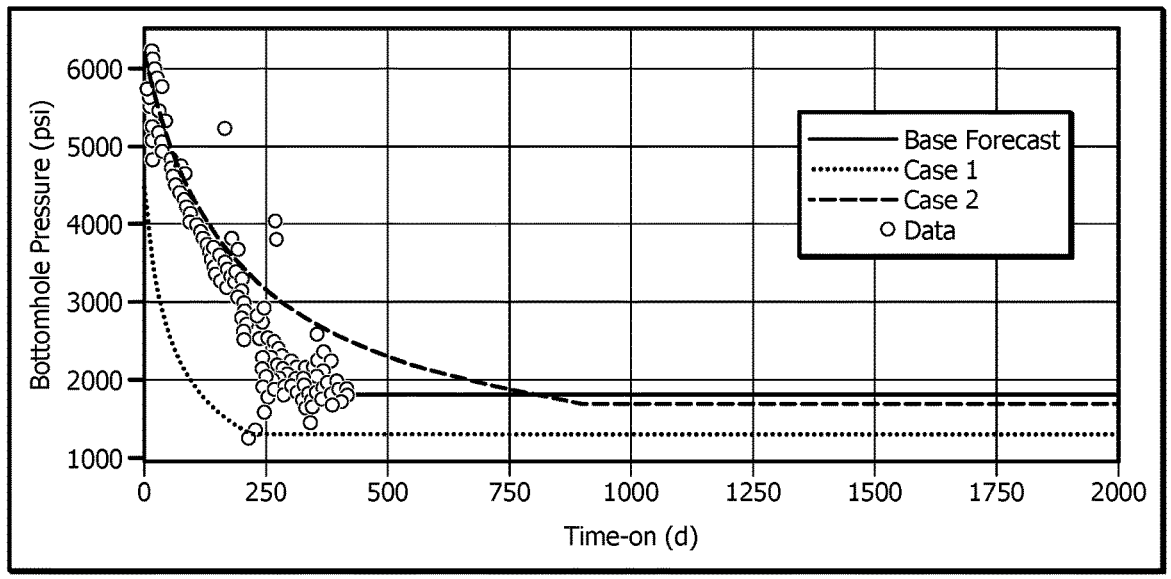
FIGS. 26A-26D are a series of plots showing forecast sensitivities.
Figure 26B:
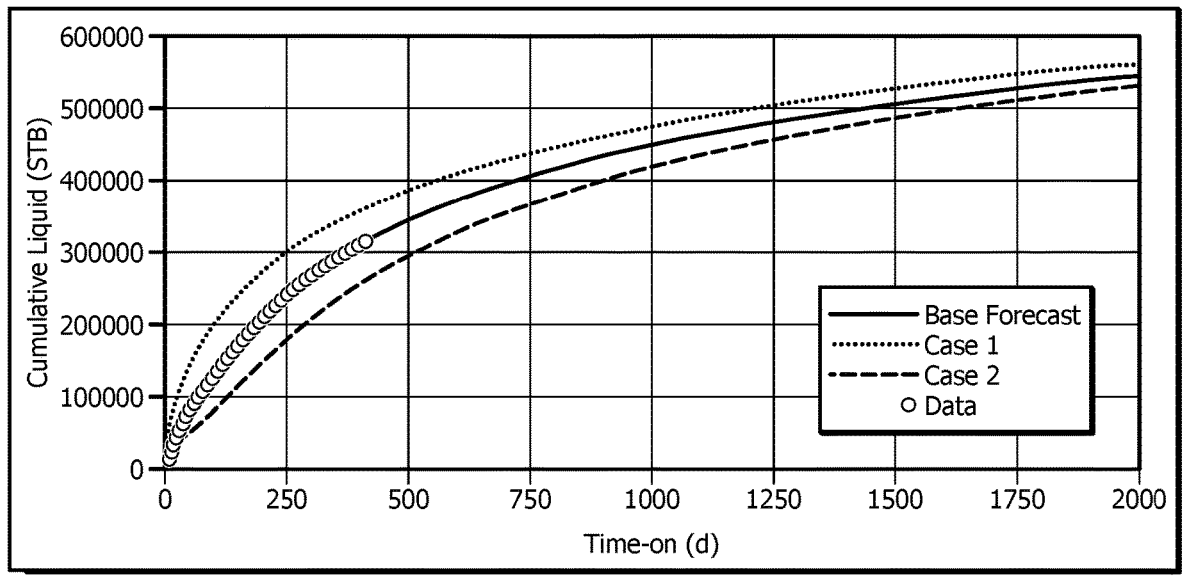
Figure 26C:
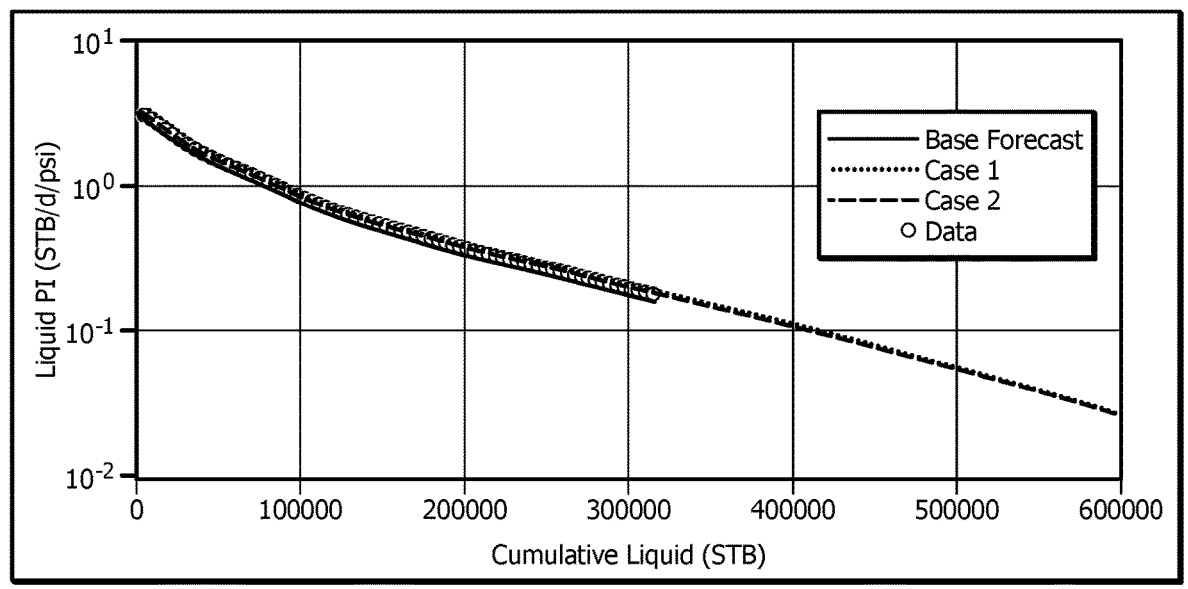
Figure 26D:
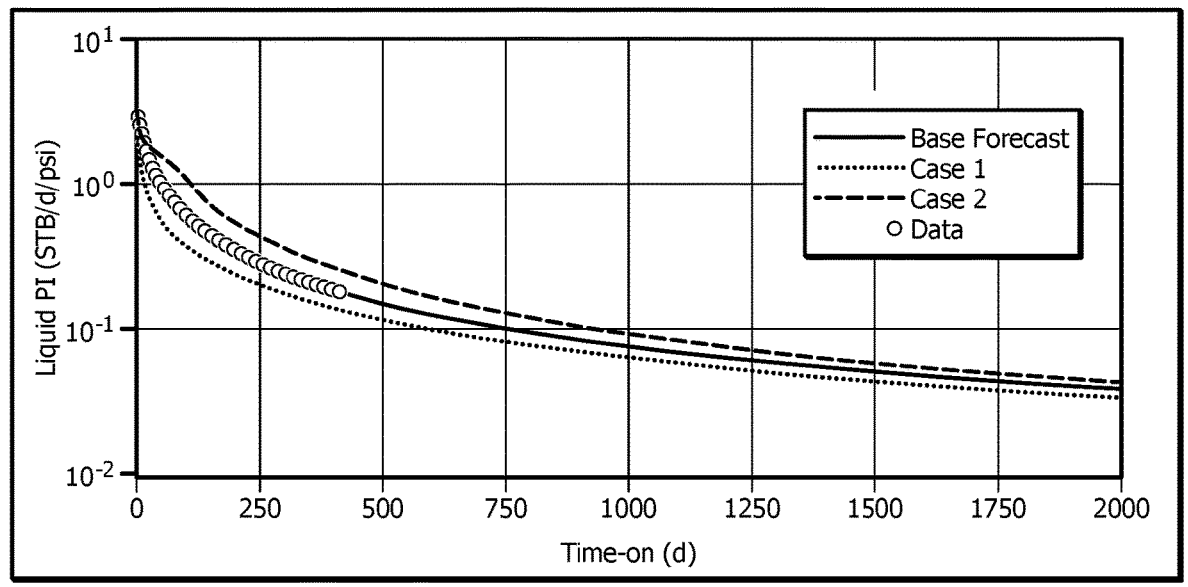

The field-wide results are shown in FIG. 25 for oil forecasting. Similar results were obtained for the gas and water phase forecast. In this example, each well was forecasted with various training data windows up to a full year (e.g., 30, 60, 90, days, etc.) using the remaining "known" data as a blind hold-out sample. Only wells with large histories were included, to guarantee a representative validation dataset is available. As expected, for any forecasting model, the prediction errors may be large when using a limited dataset but systematically reduce as more training data is included.

However, the PIBF method may perform better relative to DCA especially at an initial time period, when production declines are yet not very well defined, achieving a median well-level error reduction from ~65% to ~45%. As more training data is included, the performance of both methods may start converging on similar outputs, as enough data is available to define a clear production decline trend. However, even with larger training data windows, an improved forecast accuracy may be obtained through the PIBF method.

Wells may be severely constrained for several months, as shown previously in FIGS. 12A-12B and FIGS. 13A-13B. In such cases, the DCA method may not capture a meaningful decline trend, while the PI may decline as pressures will drop even when rates are held flat due to surface production constraints. The PIBF method may be more advantageous against rate-based methods when significant production constraints are experienced.

Besides predicting production, the PIBF method may have other applications, allowing the evaluation of production optimization opportunities. Various BHP scenarios may be generated to reflect different operational scenarios (for example, constrained vs unconstrained facilities, or various conservative vs aggressive artificial lift strategies), and the PI-based forecast may predict the expected production for each scenario, determining the most economically optimal case.

FIGS. 26A-26D illustrate an example where the base case generated a production forecast with the actual flowing conditions, extrapolated with a constant bottomhole pressure profile. Two additional production sensitivity cases were evaluated:

Case 1 generated a production profile assuming an aggressive pressure drawdown representing an unconstrained system with maximum pressure drawdown (for example, using an electric submersible pump)

Case 2 considered a more conservative scenario with a moderate BHP profile.

In this example, by reducing the bottomhole pressure, there may be a noticeable increase in oil production, especially at an initial time period while still honoring material balance (since the profiles converge to similar ultimate recovery volumes at late time), which influences the well economics. These sensitivities may allow evaluating what-if scenarios, quantifying the production impact of various field constraints and artificial strategies and compute the impact on economic value.

The well performance analysis may be useful evaluating pilot tests and field trials. When comparing various completion designs, often pilot and control wells are not produced with the same operating conditions, generating biases when the analysis is carried out purely with produced rates. By using the PI and drainage volume as key analysis variables, all wells in a pilot study may be effectively normalized, to extract their true reservoir potential, and estimate the best economic design.

The complete workflow may be fully automated and deployed as a continuous calculation, allowing an automated assessment of well performance for all wells in a field through control system 130 (referring to FIG. 4).

A reduced-physics workflow may be developed to characterize GOR and production performance in unconventional wells through computation of the Productivity Index (PI) metric by combining diffusive time of flight (DTOF) and material balance concepts. PI represents the transient well performance and is a key indicator of the well potential, thus normalizing operational impacts. In certain embodiments, the method of the present disclosure may be practical and use only routinely available field data. In certain embodiments, the method of the present disclosure does not make any assumptions about reservoir homogeneity, flow regimes or production mechanisms.

The computed features (namely, PI, drainage volume, instantaneous recovery ratio, average reservoir pressure) may be used to normalize and compare well performance. Additionally, average reservoir pressure and PI may be used to represent well deliverability (as a dynamic IPR curve) at various field conditions (past and future) that can be used for drawdown management, artificial lift planning and optimization.

The PI-based forecasting method of the present disclosure may provide a robust and sustainable approach to incorporate pressure into multiphase rate forecasting. The method may be applicable to wide range of fluid systems (incompressible, slightly compressible, and compressible), while considering depletion below the saturation pressure.

The present disclosure may provide a scalable PI-based method to understand well performance and forecast future production. Example methods of the present disclosure may overcome common challenges encountered for analyzing well performance in unconventional reservoirs that are traditionally based on rate decline-based methods, thus normalizing the effect of surface operations on well performance. The methodology may include gas and saturated oil reservoirs (compressible fluids), as well as incorporating the effects of variable total compressibility and pressure-dependent PVT properties.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

A number of examples have been described. Nevertheless, it will be understood that various modifications can be made. Accordingly, other implementations are within the scope of the following claims.

What is claimed is:

1. A method for modeling gas-oil ratio (GOR) for a well in an unconventional reservoir, comprising:
   receiving a tubing head pressure and flowrates of oil, gas, and water for the well during well production;
   determining a bottomhole pressure (BHP) for the well based, at least in part, on the tubing head pressure and the flowrates of oil, gas, and water;
   determining one or more pressure, volume, and temperature (PVT) properties associated with fluid flow from the well based at least on the flowrates of oil, gas, and water;
   determining a dataset of cumulative oil production values and cumulative gas production values for a plurality of time steps based on the flowrates of oil and gas for the well;
   analyzing the dataset to determine an inflection point in a log-log relationship between cumulative oil production and cumulative gas production, the inflection point representing a point at which gas produced from the well is solution gas;
   for one or more groups of continuous time steps following the inflection point, estimating average reservoir pressure by performing history matching of an estimated cumulative GOR to an observed cumulative GOR of the well, the estimated cumulative GOR being dependent at least on the average reservoir pressure, and the observed cumulative GOR calculated using the cumulative oil production and the cumulative gas production, wherein the history matching is performed based at least on the BHP and the PVT properties;
   determining a productivity index (PI) for the well for the plurality of time steps based at least on the estimated average reservoir pressure;
   performing a liquid production rate forecast for the well based at least on the determined PI; and
   forecasting a cumulative GOR for the well based at least on the liquid production rate forecast.

2. The method of claim 1, wherein the productivity index (PI) for the well is determined based on the estimated average reservoir pressure, the BHP, and a cumulative liquid flowrate.

3. The method of claim 1, wherein the liquid production rate forecast for the well is a forecast of oil production rate and water production rate.

4. The method of claim 1, further comprising determining an instantaneous GOR based on the forecasted cumulative GOR and updating a GOR model for the well.

5. The method of claim 4, further comprising performing a gas production rate forecast for the well based at least in part on the GOR model for the well.

6. The method of claim 1, wherein analyzing the data set comprises, if any artificial lift or other change in operating conditions of the well have been performed at the well:
   performing a piecewise linear fit process on the log-log relationship between a starting time and a first time step coinciding with an artificial lift or other change in operating conditions of the well that occurred first chronologically after the starting time;
   (a) if a change in slope of the log-log relationship is detected via the piecewise linear fit process, determining the inflection point to be a point where the slope changes;
   (b) if no change in slope of the log-log relationship is detected via the piecewise linear fit process, performing the piecewise linear fit process on the log-log relationship between the starting time and another time step coinciding with either: an artificial lift or other change in operating conditions of the well that occurred next chronologically, or an end of the dataset; and
   repeating steps (a) and (b) until the inflection point is determined.

7. The method of claim 1, wherein analyzing the data set comprises, if no artificial lift or other change in operating conditions of the well have been performed at the well:
   performing a piecewise linear fit process on the log-log relationship between a starting time and an end time step coinciding with an end of the dataset; and
   determining the inflection point to be a point where a change in slope of the log-log relationship is detected.

8. The method of claim 1, wherein the history matching is an optimization algorithm configured to solve for an average reservoir pressure that minimizes a difference between the observed cumulative GOR and the estimated cumulative GOR.

9. The method of claim 8, wherein the average reservoir pressure is constrained to follow a hyperbolic decline as a function of cumulative oil volume in the optimization algorithm.

10. The method of claim 1, further comprising forecasting the cumulative GOR for the well based at least on the liquid production rate forecast, one or more PVT properties, and the BHP.

11. The method of claim 1, further comprising producing fluids from the well based on the liquid production rate forecast and the forecasted cumulative GOR for the well.

12. A method for producing fluids from a well in an unconventional reservoir,
   comprising:
   determining a bottomhole pressure (BHP) for the well based, at least in part, on a tubing head pressure and flowrates of oil, gas, and water from the well;
   determining one or more pressure, volume, and temperature (PVT) properties associated with fluid flow from the well based at least on the flowrates of oil, gas, and water;

determining a dataset of cumulative oil production values and cumulative gas production values for a plurality of time steps based on the flowrates of oil and gas for the well;

analyzing the dataset to determine an inflection point in a log-log relationship between cumulative oil production and cumulative gas production, the inflection point representing a point at which gas produced from the well is solution gas;

for one or more groups of continuous time steps following the inflection point, estimating average reservoir pressure by performing history matching of an estimated cumulative GOR to an observed cumulative GOR of the well, the estimated cumulative GOR being dependent at least on the average reservoir pressure, and the observed cumulative GOR calculated using the cumulative oil production and the cumulative gas production, wherein the history matching is performed based on the BHP and the PVT properties;

determining a productivity index (PI) for the well for the plurality of time steps based at least on the estimated average reservoir pressure; and performing a multi-phase production rate forecast for the well based at least on the determined PI; and producing fluids from the well based on the multi-phase production rate forecast.

13. The method of claim 12, further comprising receiving the tubing head pressure and flowrates of oil, gas, and water for the well during well production.

14. The method of claim 12, wherein performing the multi-phase production rate forecast for the well comprises:

performing a liquid production rate forecast for the well based at least on the determined PI;

forecasting a cumulative GOR for the well based at least on the liquid production rate forecast; and performing a gas production rate forecast for the well based at least in part on the forecasted cumulative GOR for the well.

15. The method of claim 14, wherein the liquid production rate forecast for the well comprises an oil production rate forecast and a water production rate forecast.

16. The method of claim 12, wherein the PI for the well is determined based on the estimated average reservoir pressure, the BHP, and a cumulative liquid rate.

17. The method of claim 12, wherein analyzing the data set comprises, if any artificial lift or other change in operating conditions of the well have been performed at the well:

performing a piecewise linear fit process on the log-log relationship between a starting time and a first time step coinciding with an artificial lift or other change in operating conditions of the well that occurred first chronologically after the starting time;

(a) if a change in slope of the log-log relationship is detected via the piecewise linear fit process, determining the inflection point to be a point where the slope changes;

(b) if no change in slope of the log-log relationship is detected via the piecewise linear fit process, performing the piecewise linear fit process on the log-log relationship between the starting time and another time step coinciding with either: an artificial lift or other change in operating conditions of the well that occurred next chronologically, or an end of the dataset; and repeating steps (a) and (b) until the inflection point is determined.

18. The method of claim 12, wherein analyzing the data set comprises, if no artificial lift or other change in operating conditions of the well have been performed at the well:

performing a piecewise linear fit process on the log-log relationship between a starting time and an end time step coinciding with an end of the dataset; and determining the inflection point to be a point where a change in slope of the log-log relationship is detected.

19. The method of claim 12, wherein the history matching is an optimization algorithm configured to solve for an average reservoir pressure that minimizes a difference between the observed cumulative GOR and the estimated cumulative GOR.

20. The method of claim 19, wherein the average reservoir pressure is constrained to follow a hyperbolic decline as a function of cumulative oil volume in the optimization algorithm.

* * * * *